US012301723B2

(12) United States Patent
Shirvanian et al.

(10) Patent No.: US 12,301,723 B2
(45) Date of Patent: May 13, 2025

(54) METHOD, SYSTEM, AND COMPUTER PROGRAM PRODUCT FOR AUTHENTICATION

(71) Applicant: Visa International Service Association, San Francisco, CA (US)

(72) Inventors: Maliheh Shirvanian, Cupertino, CA (US); Mihai Christodorescu, Belmont, CA (US); Daniel Siegfried Werner Masny, Palo Alto, CA (US); Ivan De Oliveira Nunes, Fullerton, CA (US); Peter Byerly Rindal, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 226 days.

(21) Appl. No.: 17/798,693

(22) PCT Filed: Feb. 12, 2021

(86) PCT No.: PCT/US2021/017915
§ 371 (c)(1),
(2) Date: Aug. 10, 2022

(87) PCT Pub. No.: WO2021/163532
PCT Pub. Date: Aug. 19, 2021

(65) Prior Publication Data
US 2023/0131437 A1 Apr. 27, 2023

Related U.S. Application Data

(60) Provisional application No. 62/976,777, filed on Feb. 14, 2020.

(51) Int. Cl.
*H04L 9/32* (2006.01)
*H04L 9/08* (2006.01)

(52) U.S. Cl.
CPC .......... *H04L 9/3231* (2013.01); *H04L 9/0819* (2013.01); *H04L 9/0894* (2013.01)

(58) Field of Classification Search
CPC ...................................................... H04L 9/3231
See application file for complete search history.

(56) References Cited

U.S. PATENT DOCUMENTS 10,262,129 B1 * 4/2019 Gupta ................. G06F 16/3344
10,313,317 B2 * 6/2019 O'Regan ............... H04L 63/083
(Continued)

FOREIGN PATENT DOCUMENTS

WO 2018078003 A1 5/2018
WO 2019032301 A1 2/2019

OTHER PUBLICATIONS

Choi et al., "Two-Factor Fuzzy Commitment of Unmanned IoT Devices Security", IEEE Internet of Things Journal, Feb. 2019, pp. 335-348, vol. 6, No. 1.
(Continued)

*Primary Examiner* — Simon P Kanaan
(74) *Attorney, Agent, or Firm* — The Webb Law Firm

(57) ABSTRACT

Provided is a method for authentication. The method may include receiving first password data, first biometric input data, and first secret key data. A second secret key may be generated based on the first secret key and the first password. Fuzzy extractor helper data may be generated based on the first biometric input and the second secret key. The fuzzy extractor helper data and the first secret key may be stored. The user may be authenticated based on an attempted password and/or a second biometric input. A system and computer program product are also disclosed.

18 Claims, 10 Drawing Sheets

(56) References Cited

U.S. PATENT DOCUMENTS

| | | | |
|---|---|---|---|
| 2007/0118758 A1 | 5/2007 | Takahashi et al. | |
| 2015/0095654 A1 | 4/2015 | Li et al. | |
| 2016/0269178 A1* | 9/2016 | Yang | H04L 63/0861 |
| 2017/0185761 A1 | 6/2017 | Stanwood et al. | |
| 2018/0108020 A1* | 4/2018 | Thatte | H04L 9/0866 |
| 2019/0372771 A1 | 12/2019 | Wagner et al. | |
| 2020/0076604 A1* | 3/2020 | Argones Rua | H04L 9/3278 |

OTHER PUBLICATIONS

Dinca et al., "User-Centric Key Entropy: Study of Biometric Key Derivation Subject to Spoofing Attacks", Entropy, 2017, pp. 1-21.

Jarecki et al., "Device-Enhanced Password Protocols with Optimal Online-Offline Protection", Proceedings of the 11th ACM on Asia Conference on Computer and Communications Security, Mar. 2017, pp. 177-188.

Machado et al., "Securing ATM pins and passwords using Fingerprint based Fuzzy Vault System", Fourth International Conference on Computing Communication Control and Automation, 2018, 6 pages.

Meenakshi et al., "Security Analysis of Password Hardened Multimodal Biometric Fuzzy Vault", World Academy of Science, Engineering and Technology 56, 2009, pp. 312-320.

Meenakshi et al., "Security Analysis of Password Hardened Multimodal Biometric Fuzzy Vault with Combined Feature Points Extracted from Fingerprint, Iris and Retina for High Security Applications", Procedia Computer Science 2, 2010, pp. 195-206.

Nandakumar et al., "Fingerprint-Based Fuzzy Vault: Implementation and Performance", IEEE Transactions on Information Forensics and Security, Dec. 2007, pp. 744-757, vol. 2, No. 4.

Nunes et al., "Secure Non-Interactive User Re-Enrollment in Biometrics-based Identification and Authentication Systems", International Symposium on Cyber Security Cryptography and Machine Learning, 2018, pp. 162-180, Springer.

Maurya et al., "Secure and Efficient Authenticated Key Exchange Mechanism for Wireless Sensor Networks and Internet of Things Using Bloom Filter", 2017 IEEE 3rd International Conference on Collaboration and Internet Computing (CIC), 2017, pp. 173-180.

Meenakshi et al., "Security Analysis of Hardened Retina Based Fuzzy Vault", 2009 International Conference on Advances in Recent Technologies in Communication and Computing, IEEE, 2009, pp. 926-930.

* cited by examiner

User Device — 506

Authentication system — 502 no input on inputs: $U_{ID}, ET, d, dim, w, m, n, \mathcal{K}$

1: $L_m \leftarrow \{b_1, ..., b_m\} = Ext(ET)$
2: $L_n \leftarrow \{c_1, ..., c_n\}$ s.t. $\forall_i : \{c_i \leftarrow_\$ D\}$
   (For prob. distribution D)
3: $\Pi_S$ is a random permutation of n+m elements
4: $L \leftarrow L_m + L_n$
5: $P_\mathcal{K}(\cdot) \leftarrow poly\_encode(\mathcal{K})$
6: $S \leftarrow []$ (empty list)
7: $\forall e \in L$:
   $s_e \leftarrow \{x | dist(x, e) \leq w\}$
   $e \leftarrow_\$ \mathbb{Z}_p$
   $if (e \in L_m)$:
       $p_e \leftarrow P_\mathcal{K}(e)$
   $else\, if (e \in L_n)$:
       $p_e \leftarrow_\$ \mathbb{Z}_p$
   $S \leftarrow S.append(\{s_e, (e, p_e)\})$
8: $D \leftarrow \Pi(S)$ $U_{ID}, D, H_1(\mathcal{K}), H_2(\mathcal{K})$ →

9: $FillUp(D)$
10: $ED \leftarrow [D, H_1(\mathcal{K}), H_2(\mathcal{K})]$
11: $storeEntry(U_{ID}, ED)$

FIG. 5B

METHOD, SYSTEM, AND COMPUTER PROGRAM PRODUCT FOR AUTHENTICATION

CROSS REFERENCE TO RELATED APPLICATIONS

This application is the United States national phase of International Application No. PCT/US2021/017915 filed Feb. 12, 2021, and claims the benefit of U.S. Provisional Patent Application No. 62/976,777, filed on Feb. 14, 2020, the disclosures of which are hereby incorporated by reference in their entirety.

BACKGROUND

1. Technical Field

This disclosed subject matter relates generally to methods, systems, and products for authentication and, in some particular embodiments or aspects, to a method, system, and computer program product for authentication based on at least one biometric input and/or at least one secret key.

2. Technical Considerations

Certain authentication techniques may use textual inputs. For example, some such techniques may use a password. However, it may be difficult for a user to remember such a password. For example, a user may have multiple different passwords for multiple different accounts, and each password may have different criteria for what must be included therein. Additionally, some such authentication techniques may use two-factor authentication (2FA). However, 2FA may require a user to carry a separate device. Additionally or alternatively, 2FA may be burdensome because a user may need to sign into and/or otherwise have access to a separate account.

Certain authentication techniques may use biometric data. Biometric authentication may provide higher usability compared to textual authentication, e.g., because the user may not need to remember a password and/or may not need to carry a separate device and/or have access to a separate account (e.g., unlike 2FA). However, unlike passwords or other textual inputs, biometric data may not be able to be updated readily (e.g., updated repeatedly, indefinitely, ever, and/or the like). Thus, there may be an increased risk associated with stolen biometric data (e.g., compared to a stolen password). Even if the biometric data were encrypted and/or masked, if an attacker obtained the encrypted and/or masked version of the biometric data, the attacker may be able to recover the biometric data and/or otherwise employ the encrypted and/or masked version of the biometric data in a re-usability attack.

SUMMARY

Accordingly, the presently disclosed subject matter provides improved methods, systems, and computer program products for authentication.

According to non-limiting embodiments or aspects, provided is a method for authentication. In some non-limiting embodiments or aspects, a method for authentication may include receiving first password data associated with a first password, first biometric input data associated with a first biometric input, and first secret key data associated with a first secret key. A second secret key may be generated based on the first secret key and the first password. Fuzzy extractor helper data may be generated based on the first biometric input and the second secret key. The fuzzy extractor helper data and the first secret key may be stored.

In some non-limiting embodiments or aspects, the password data and the first biometric input data may be received from a user device. Additionally or alternatively, the first secret key data may be received from a server.

In some non-limiting embodiments or aspects, the user device may include a trusted enrollment device. Additionally or alternatively, the server may include an authentication server.

In some non-limiting embodiments or aspects, attempted password data associated with an attempted password may be received. Additionally or alternatively, a reconstructed second secret key may be generated based on the first secret key and the attempted password. In some non-limiting embodiments or aspects, whether the reconstructed second secret key matches the second secret key may be determined. Additionally or alternatively, a user may be authenticated based on determining the reconstructed second secret key matches the second secret key.

In some non-limiting embodiments or aspects, generating the reconstructed second secret key may include generating the reconstructed second secret key using device-enhanced password-authenticated key exchange (DE-PAKE).

In some non-limiting embodiments or aspects, second biometric input data associated with a second biometric input may be received. Additionally or alternatively, a reconstructed second secret key may be generated based on the second biometric input and the fuzzy extractor helper data. In some non-limiting embodiments or aspects, whether the reconstructed second secret key matches the second secret key may be determined. Additionally or alternatively, a user may be authenticated based on determining the reconstructed second secret key matches the second secret key.

In some non-limiting embodiments or aspects, generating the reconstructed second secret key may include generating the reconstructed second secret key using a fuzzy vault opener ($FV_{OPEN}$).

In some non-limiting embodiments or aspects, using the $FV_{OPEN}$ may include extracting a plurality of second biometric data points from the second biometric input. Additionally or alternatively, the plurality of second biometric data points may be communicated. Additionally or alternatively, a plurality of polynomial encodings may be received. For example, each respective polynomial encoding may be based on a respective second biometric data point of the plurality of second biometric data points. Additionally or alternatively, the fuzzy extractor helper data may include the plurality of polynomial encodings. Additionally or alternatively, the reconstructed second secret key may be generated based on the plurality of polynomial encodings.

In some non-limiting embodiments or aspects, generating the second secret key may include generating the second secret key using device-enhanced password-authenticated key exchange (DE-PAKE).

In some non-limiting embodiments or aspects, generating the fuzzy extractor helper data may include generating the fuzzy extractor helper data using a fuzzy vault generator ($FV_{GEN}$).

In some non-limiting embodiments or aspects, using the $FV_{GEN}$ may include extracting a plurality of first biometric data points from the first biometric input. Additionally or alternatively, a plurality of random data points may be generated. Additionally or alternatively, a polynomial encoding of each first biometric data point of the plurality of first biometric data points may be generated based on the second secret key. Additionally or alternatively, a random encoding of each random data point of the plurality of random data points may be generated. Additionally or alternatively, the polynomial encoding of each first biometric data point and the random encoding of each random data point may be combined into a set of encodings. In some non-limiting embodiments or aspects, the fuzzy extractor helper data may include the set of encodings.

In some non-limiting embodiments or aspects, using the $FV_{GEN}$ may further include combining the plurality of first biometric data points and the plurality of random data points to form a first set of data points. Additionally or alternatively, a respective set of neighboring data points for each respective data point of the first set of data points may be generated based on a threshold distance. Additionally or alternatively, each respective set of neighboring data points may be stored as a tuple with each respective data point in the set of encodings.

In some non-limiting embodiments or aspects, using the $FV_{GEN}$ may further include permuting the set of encodings before storing the fuzzy extractor helper data comprising the set of encodings.

According to non-limiting embodiments or aspects, provided is a method for authentication. In some non-limiting embodiments or aspects, a method for authentication may include receiving first biometric input data associated with a first biometric input and first secret key data associated with a first secret key. A plurality of first biometric data points from the first biometric input may be extracted. A plurality of random data points may be generated. A polynomial encoding of each first biometric data point of the plurality of first biometric data points may be generated based on the first secret key. A random encoding of each random data point of the plurality of random data points may be generated. The polynomial encoding of each first biometric data point of the plurality of first biometric data points and the random encoding of each random data point of the plurality of random data points may be combined into a set of encodings. The set of encodings may be stored as fuzzy extractor helper data.

In some non-limiting embodiments or aspects, second biometric input data associated with a second biometric input may be received. Additionally or alternatively, a plurality of second biometric data points may be extracted from the second biometric input. Additionally or alternatively, the plurality of second biometric data points may be communicated. Additionally or alternatively, a plurality of encodings may be received, and each respective encoding of the plurality of encodings may be based on a respective second biometric data point of the plurality of second biometric data points. Additionally or alternatively, the set of encodings of the fuzzy extractor helper data may include the plurality of encodings. Additionally or alternatively, a reconstructed first secret key may be generated based on the plurality of polynomial encodings. Additionally or alternatively, whether the reconstructed first secret key matches the first secret key may be determined. Additionally or alternatively, a user may be authenticated based on determining the reconstructed first secret key matches the first secret key.

According to non-limiting embodiments or aspects, provided is a system for authentication. In some non-limiting embodiments or aspects, a system for authentication may include at least one processor and at least one non-transitory computer-readable medium comprising instructions to direct the at least one processor to receive first password data associated with a first password, first biometric input data associated with a first biometric input, and first secret key data associated with a first secret key. The instructions may further direct the at least one processor to generate a second secret key based on the first secret key and the first password. The instructions may further direct the at least one processor to generate fuzzy extractor helper data based on the first biometric input and the second secret key. The instructions may further direct the at least one processor to store the fuzzy extractor helper data and the first secret key.

In some non-limiting embodiments or aspects, the password data and the first biometric input data may be received from a user device. Additionally or alternatively, the first secret key data may be received from a server.

In some non-limiting embodiments or aspects, the user device may include a trusted enrollment device. Additionally or alternatively, the server may include an authentication server.

In some non-limiting embodiments or aspects, attempted password data associated with an attempted password may be received. Additionally or alternatively, a reconstructed second secret key may be generated based on the first secret key and the attempted password. In some non-limiting embodiments or aspects, whether the reconstructed second secret key matches the second secret key may be determined. Additionally or alternatively, a user may be authenticated based on determining the reconstructed second secret key matches the second secret key.

In some non-limiting embodiments or aspects, generating the reconstructed second secret key may include generating the reconstructed second secret key using device-enhanced password-authenticated key exchange (DE-PAKE).

In some non-limiting embodiments or aspects, second biometric input data associated with a second biometric input may be received. Additionally or alternatively, a reconstructed second secret key may be generated based on the second biometric input and the fuzzy extractor helper data. In some non-limiting embodiments or aspects, whether the reconstructed second secret key matches the second secret key may be determined. Additionally or alternatively, a user may be authenticated based on determining the reconstructed second secret key matches the second secret key.

In some non-limiting embodiments or aspects, generating the reconstructed second secret key may include generating the reconstructed second secret key using a fuzzy vault opener ($FV_{OPEN}$).

In some non-limiting embodiments or aspects, using the $FV_{OPEN}$ may include extracting a plurality of second biometric data points from the second biometric input. Additionally or alternatively, the plurality of second biometric data points may be communicated. Additionally or alternatively, a plurality of polynomial encodings may be received. For example, each respective polynomial encoding may be based on a respective second biometric data point of the plurality of second biometric data points. Additionally or alternatively, the fuzzy extractor helper data may include the plurality of polynomial encodings. Additionally or alternatively, the reconstructed second secret key may be generated based on the plurality of polynomial encodings.

In some non-limiting embodiments or aspects, generating the second secret key may include generating the second secret key using device-enhanced password-authenticated key exchange (DE-PAKE).

In some non-limiting embodiments or aspects, generating the fuzzy extractor helper data may include generating the fuzzy extractor helper data using a fuzzy vault generator ($FV_{GEN}$).

In some non-limiting embodiments or aspects, using the $FV_{GEN}$ may include extracting a plurality of first biometric data points from the first biometric input. Additionally or alternatively, a plurality of random data points may be generated. Additionally or alternatively, a polynomial encoding of each first biometric data point of the plurality of first biometric data points may be generated based on the second secret key. Additionally or alternatively, a random encoding of each random data point of the plurality of random data points may be generated. Additionally or alternatively, the polynomial encoding of each first biometric data point and the random encoding of each random data point may be combined into a set of encodings. In some non-limiting embodiments or aspects, the fuzzy extractor helper data may include the set of encodings.

In some non-limiting embodiments or aspects, using the $FV_{GEN}$ may further include combining the plurality of first biometric data points and the plurality of random data points to form a first set of data points. Additionally or alternatively, a respective set of neighboring data points for each respective data point of the first set of data points may be generated based on a threshold distance. Additionally or alternatively, each respective set of neighboring data points may be stored as a tuple with each respective data point in the set of encodings.

In some non-limiting embodiments or aspects, using the $FV_{GEN}$ may further include permuting the set of encodings before storing the fuzzy extractor helper data comprising the set of encodings.

According to non-limiting embodiments or aspects, provided is a system for authentication. In some non-limiting embodiments or aspects, a system for authentication may include at least one processor and at least one non-transitory computer-readable medium comprising instructions to direct the at least one processor to receive first biometric input data associated with a first biometric input and first secret key data associated with a first secret key. The instructions may further direct the at least one processor to extract a plurality of first biometric data points from the first biometric input. The instructions may further direct the at least one processor to generate a plurality of random data points. The instructions may further direct the at least one processor to generate a polynomial encoding of each first biometric data point of the plurality of first biometric data points based on the first secret key. The instructions may further direct the at least one processor to generate a random encoding of each random data point of the plurality of random data points. The instructions may further direct the at least one processor to combine the polynomial encoding of each first biometric data point of the plurality of first biometric data points and the random encoding of each random data point of the plurality of random data points into a set of encodings. The instructions may further direct the at least one processor to store the set of encodings as fuzzy extractor helper data.

In some non-limiting embodiments or aspects, second biometric input data associated with a second biometric input may be received. Additionally or alternatively, a plurality of second biometric data points may be extracted from the second biometric input. Additionally or alternatively, the plurality of second biometric data points may be communicated. Additionally or alternatively, a plurality of encodings may be received, and each respective encoding of the plurality of encodings may be based on a respective second biometric data point of the plurality of second biometric data points. Additionally or alternatively, the set of encodings of the fuzzy extractor helper data may include the plurality of encodings. Additionally or alternatively, a reconstructed first secret key may be generated based on the plurality of polynomial encodings. Additionally or alternatively, whether the reconstructed first secret key matches the first secret key may be determined. Additionally or alternatively, a user may be authenticated based on determining the reconstructed first secret key matches the first secret key.

According to non-limiting embodiments or aspects, provided is a computer program product for authentication. In some non-limiting embodiments or aspects, the computer program product may include at least one non-transitory computer-readable medium including one or more instructions that, when executed by at least one processor, cause the at least one processor to receive first password data associated with a first password, first biometric input data associated with a first biometric input, and first secret key data associated with a first secret key. The instructions may further cause the at least one processor to generate a second secret key based on the first secret key and the first password. The instructions may further cause the at least one processor to generate fuzzy extractor helper data based on the first biometric input and the second secret key. The instructions may further cause the at least one processor to store the fuzzy extractor helper data and the first secret key.

In some non-limiting embodiments or aspects, the password data and the first biometric input data may be received from a user device. Additionally or alternatively, the first secret key data may be received from a server.

In some non-limiting embodiments or aspects, the user device may include a trusted enrollment device. Additionally or alternatively, the server may include an authentication server.

In some non-limiting embodiments or aspects, attempted password data associated with an attempted password may be received. Additionally or alternatively, a reconstructed second secret key may be generated based on the first secret key and the attempted password. In some non-limiting embodiments or aspects, whether the reconstructed second secret key matches the second secret key may be determined. Additionally or alternatively, a user may be authenticated based on determining the reconstructed second secret key matches the second secret key.

In some non-limiting embodiments or aspects, generating the reconstructed second secret key may include generating the reconstructed second secret key using device-enhanced password-authenticated key exchange (DE-PAKE).

In some non-limiting embodiments or aspects, second biometric input data associated with a second biometric input may be received. Additionally or alternatively, a reconstructed second secret key may be generated based on the second biometric input and the fuzzy extractor helper data. In some non-limiting embodiments or aspects, whether the reconstructed second secret key matches the second secret key may be determined. Additionally or alternatively, a user may be authenticated based on determining the reconstructed second secret key matches the second secret key.

In some non-limiting embodiments or aspects, generating the reconstructed second secret key may include generating the reconstructed second secret key using a fuzzy vault opener ($FV_{OPEN}$).

In some non-limiting embodiments or aspects, using the $FV_{OPEN}$ may include extracting a plurality of second biometric data points from the second biometric input. Additionally or alternatively, the plurality of second biometric data points may be communicated. Additionally or alternatively, a plurality of polynomial encodings may be received. For example, each respective polynomial encoding may be based on a respective second biometric data point of the plurality of second biometric data points. Additionally or alternatively, the fuzzy extractor helper data may include the plurality of polynomial encodings. Additionally or alternatively, the reconstructed second secret key may be generated based on the plurality of polynomial encodings.

In some non-limiting embodiments or aspects, generating the second secret key may include generating the second secret key using device-enhanced password-authenticated key exchange (DE-PAKE).

In some non-limiting embodiments or aspects, generating the fuzzy extractor helper data may include generating the fuzzy extractor helper data using a fuzzy vault generator ($FV_{GEN}$).

In some non-limiting embodiments or aspects, using the $FV_{GEN}$ may include extracting a plurality of first biometric data points from the first biometric input. Additionally or alternatively, a plurality of random data points may be generated. Additionally or alternatively, a polynomial encoding of each first biometric data point of the plurality of first biometric data points may be generated based on the second secret key. Additionally or alternatively, a random encoding of each random data point of the plurality of random data points may be generated. Additionally or alternatively, the polynomial encoding of each first biometric data point and the random encoding of each random data point may be combined into a set of encodings. In some non-limiting embodiments or aspects, the fuzzy extractor helper data may include the set of encodings.

In some non-limiting embodiments or aspects, using the $FV_{GEN}$ may further include combining the plurality of first biometric data points and the plurality of random data points to form a first set of data points. Additionally or alternatively, a respective set of neighboring data points for each respective data point of the first set of data points may be generated based on a threshold distance. Additionally or alternatively, each respective set of neighboring data points may be stored as a tuple with each respective data point in the set of encodings.

In some non-limiting embodiments or aspects, using the $FV_{GEN}$ may further include permuting the set of encodings before storing the fuzzy extractor helper data comprising the set of encodings.

According to non-limiting embodiments or aspects, provided is a computer program product for authentication. In some non-limiting embodiments or aspects, the computer program product may include at least one non-transitory computer-readable medium including one or more instructions that, when executed by at least one processor, cause the at least one processor to receive first biometric input data associated with a first biometric input and first secret key data associated with a first secret key. The instructions may further cause the at least one processor to extract a plurality of first biometric data points from the first biometric input. The instructions may further cause the at least one processor to generate a plurality of random data points. The instructions may further cause the at least one processor to generate a polynomial encoding of each first biometric data point of the plurality of first biometric data points based on the first secret key. The instructions may further cause the at least one processor to generate a random encoding of each random data point of the plurality of random data points. The instructions may further cause the at least one processor to combine the polynomial encoding of each first biometric data point of the plurality of first biometric data points and the random encoding of each random data point of the plurality of random data points into a set of encodings. The instructions may further cause the at least one processor to store the set of encodings as fuzzy extractor helper data.

In some non-limiting embodiments or aspects, second biometric input data associated with a second biometric input may be received. Additionally or alternatively, a plurality of second biometric data points may be extracted from the second biometric input. Additionally or alternatively, the plurality of second biometric data points may be communicated. Additionally or alternatively, a plurality of encodings may be received, and each respective encoding of the plurality of encodings may be based on a respective second biometric data point of the plurality of second biometric data points. Additionally or alternatively, the set of encodings of the fuzzy extractor helper data may include the plurality of encodings. Additionally or alternatively, a reconstructed first secret key may be generated based on the plurality of polynomial encodings. Additionally or alternatively, whether the reconstructed first secret key matches the first secret key may be determined. Additionally or alternatively, a user may be authenticated based on determining the reconstructed first secret key matches the first secret key.

Further non-limiting embodiments or aspects are set forth in the following numbered clauses:

Clause 1: A computer-implemented method, comprising: receiving, with at least one processor, first password data associated with a first password, first biometric input data associated with a first biometric input, and first secret key data associated with a first secret key; generating, with at least one processor, a second secret key based on the first secret key and the first password; generating, with at least one processor, fuzzy extractor helper data based on the first biometric input and the second secret key; and storing, with at least one processor, the fuzzy extractor helper data and the first secret key.

Clause 2: The method of clause 1, wherein receiving comprises receiving the password data and the first biometric input data from a user device and receiving the first secret key data from a server.

Clause 3: The method of clauses 1 or 2, wherein the user device comprises a trusted enrollment device and the server comprises an authentication server.

Clause 4: The method of any of clauses 1-3, further comprising: receiving, with at least one processor, attempted password data associated with an attempted password; generating, with at least one processor, a reconstructed second secret key based on the first secret key and the attempted password; determining, with at least one processor, that the reconstructed second secret key matches the second secret key; and authenticating, with at least one processor, a user based on determining the reconstructed second secret key matches the second secret key.

Clause 5: The method of any of clauses 1-4, wherein generating the reconstructed second secret key comprises generating the reconstructed second secret key using device-enhanced password-authenticated key exchange (DE-PAKE).

Clause 6: The method of any of clauses 1-5, further comprising: receiving, with at least one processor, second biometric input data associated with a second biometric input; generating, with at least one processor, a reconstructed second secret key based on the second biometric input and the fuzzy extractor helper data; determining, with at least one processor, that the reconstructed second secret key matches the second secret key; and authenticating, with at least one processor, a user based on determining the reconstructed second secret key matches the second secret key.

Clause 7: The method of any of clauses 1-6, wherein generating the reconstructed second secret key comprises generating the reconstructed second secret key using a fuzzy vault opener ($FV_{OPEN}$).

Clause 8: The method of any of clauses 1-7, wherein using the $FV_{OPEN}$ comprises: extracting, with at least one processor, a plurality of second biometric data points from the second biometric input; communicating, with at least one processor, the plurality of second biometric data points; receiving, with at least one processor, a plurality of polynomial encodings, each respective polynomial encoding of the plurality of polynomial encodings based on a respective second biometric data point of the plurality of second biometric data points, wherein the fuzzy extractor helper data comprises the plurality of polynomial encodings; and generating, with at least one processor, the reconstructed second secret key based on the plurality of polynomial encodings.

Clause 9: The method of any of clauses 1-8, wherein generating the second secret key comprises generating the second secret key using device-enhanced password-authenticated key exchange (DE-PAKE).

Clause 10: The method of any of clauses 1-9, wherein generating the fuzzy extractor helper data comprises generating the fuzzy extractor helper data using a fuzzy vault generator ($FV_{GEN}$).

Clause 11: The method of any of clauses 1-10, wherein using the $FV_{GEN}$ comprises: extracting, with at least one processor, a plurality of first biometric data points from the first biometric input; generating, with at least one processor, a plurality of random data points; generating, with at least one processor, a polynomial encoding of each first biometric data point of the plurality of first biometric data points based on the second secret key; generating, with at least one processor, a random encoding of each random data point of the plurality of random data points; and combining, with at least one processor, the polynomial encoding of each first biometric data point of the plurality of first biometric data points and the random encoding of each random data point of the plurality of random data points into a set of encodings, wherein the fuzzy extractor helper data comprises the set of encodings.

Clause 12: The method of any of clauses 1-11, wherein using the $FV_{GEN}$ further comprises: combining, with at least one processor, the plurality of first biometric data points and the plurality of random data points to form a first set of data points; generating, with at least one processor, a respective set of neighboring data points for each respective data point of the first set of data points based on a threshold distance; and storing each respective set of neighboring data points as a tuple with each respective data point in the set of encodings.

Clause 13: The method of any of clauses 1-12, wherein using the $FV_{GEN}$ further comprises: permuting, with at least one processor, the set of encodings before storing the fuzzy extractor helper data comprising the set of encodings.

Clause 14: A computer-implemented method, comprising: receiving, with at least one processor, first biometric input data associated with a first biometric input and first secret key data associated with a first secret key; extracting, with at least one processor, a plurality of first biometric data points from the first biometric input; generating, with at least one processor, a plurality of random data points; generating, with at least one processor, a polynomial encoding of each first biometric data point of the plurality of first biometric data points based on the first secret key; generating, with at least one processor, a random encoding of each random data point of the plurality of random data points; combining, with at least one processor, the polynomial encoding of each first biometric data point of the plurality of first biometric data points and the random encoding of each random data point of the plurality of random data points into a set of encodings; and storing, with at least one processor, the set of encodings as fuzzy extractor helper data.

Clause 15: The method of clause 14, comprising: receiving, with at least one processor, second biometric input data associated with a second biometric input; extracting, with at least one processor, a plurality of second biometric data points from the second biometric input; communicating, with at least one processor, the plurality of second biometric data points; receiving, with at least one processor, a plurality of encodings, each respective encoding of the plurality of encodings based on a respective second biometric data point of the plurality of second biometric data points, wherein the set of encodings of the fuzzy extractor helper data comprises the plurality of encodings; generating, with at least one processor, a reconstructed first secret key based on the plurality of polynomial encodings; determining, with at least one processor, that the reconstructed first secret key matches the first secret key; and authenticating, with at least one processor, a user based on determining the reconstructed first secret key matches the first secret key.

Clause 16: A system, comprising: at least one processor; and at least one non-transitory computer-readable medium comprising instructions to direct the at least one processor to: receive first password data associated with a first password, first biometric input data associated with a first biometric input, and first secret key data associated with a first secret key; generate a second secret key based on the first secret key and the first password; generate fuzzy extractor helper data based on the first biometric input and the second secret key; and store the fuzzy extractor helper data and the first secret key.

Clause 17: A system, comprising: at least one processor; and at least one non-transitory computer-readable medium comprising instructions to direct the at least one processor to: receive first biometric input data associated with a first biometric input and first secret key data associated with a first secret key; extract a plurality of first biometric data points from the first biometric input; generate a plurality of random data points; generate a polynomial encoding of each first biometric data point of the plurality of first biometric data points based on the first secret key; generate a random encoding of each random data point of the plurality of random data points; combine the polynomial encoding of each first biometric data point of the plurality of first biometric data points and the random encoding of each random data point of the plurality of random data points into a set of encodings; and store the set of encodings as fuzzy extractor helper data.

Clause 18: A computer program product, the computer program product comprising at least one non-transitory computer-readable medium including one or more instructions that, when executed by at least one processor, cause the at least one processor to: receive first password data associated with a first password, first biometric input data associated with a first biometric input, and first secret key data associated with a first secret key; generate a second secret key based on the first secret key and the first password; generate fuzzy extractor helper data based on the first biometric input and the second secret key; and store the fuzzy extractor helper data and the first secret key.

Clause 19: A computer program product, the computer program product comprising at least one non-transitory computer-readable medium including one or more instructions that, when executed by at least one processor, cause the at least one processor to: receive first biometric input data associated with a first biometric input and first secret key data associated with a first secret key; extract a plurality of first biometric data points from the first biometric input; generate a plurality of random data points; generate a polynomial encoding of each first biometric data point of the plurality of first biometric data points based on the first secret key; generate a random encoding of each random data point of the plurality of random data points; combine the polynomial encoding of each first biometric data point of the plurality of first biometric data points and the random encoding of each random data point of the plurality of random data points into a set of encodings; and store the set of encodings as fuzzy extractor helper data.

Clause 20: A system, comprising: at least one processor; and at least one non-transitory computer-readable medium comprising instructions to direct the at least one processor to perform the method of any of clauses 1-15.

Clause 21: A computer program product, the computer program product comprising at least one non-transitory computer-readable medium including one or more instructions that, when executed by at least one processor, cause the at least one processor to perform the method of any of clauses 1-15.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which:

FIG. 5B is a swimlane diagram for non-limiting embodiments or aspects of a two-party computation fuzzy vault generator ($FV_{GEN}^{2PC}$) relating to the implementation of FIG. 5A according to the principles of the presently disclosed subject matter;

DESCRIPTION

Figure 1:
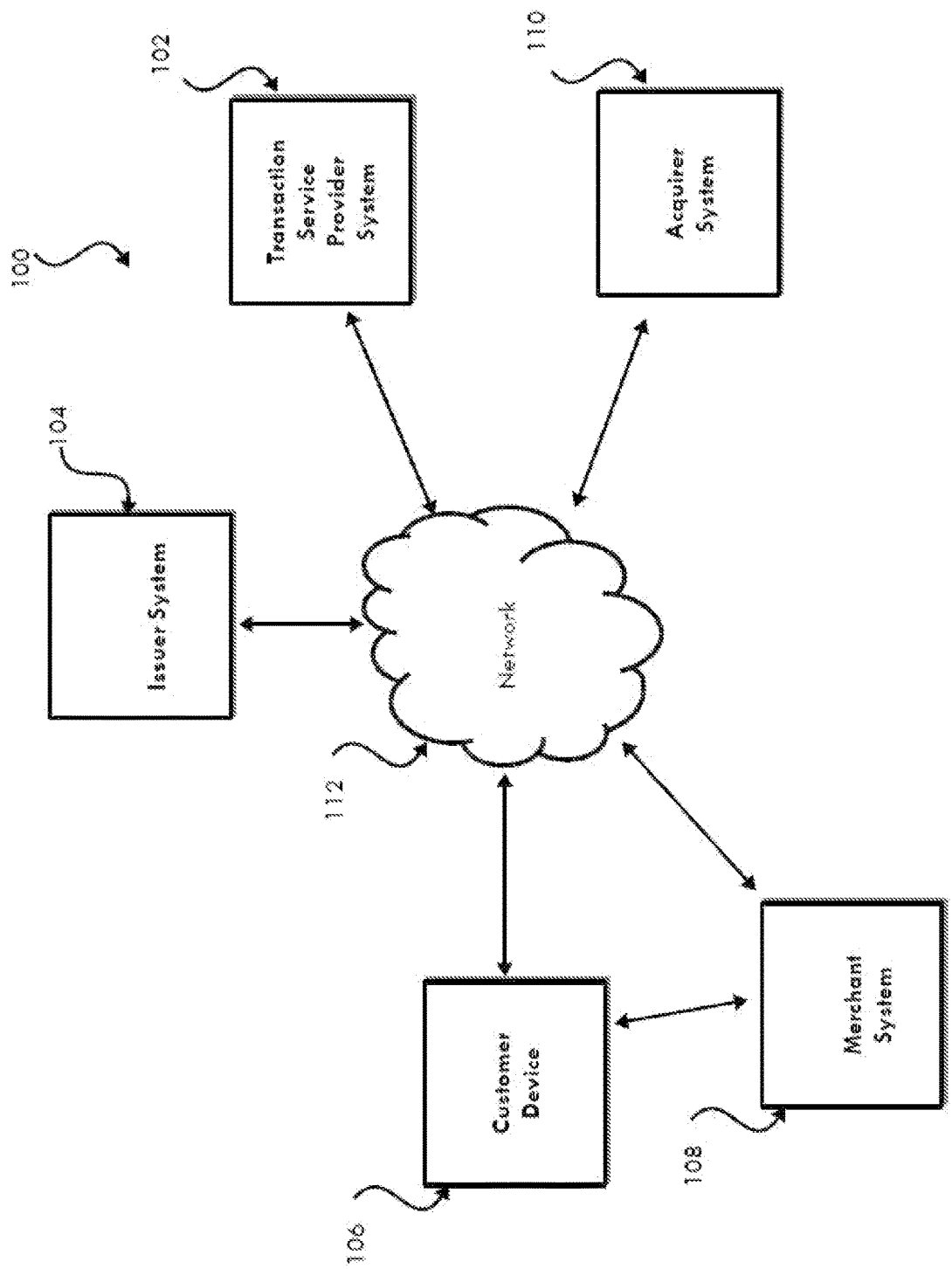
FIG. 1 is a diagram of a non-limiting embodiment or aspect of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature.

Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a payment token, and/or the like). In some non-limiting embodiments or aspects, an issuer institution may provide an account identifier (e.g., a PAN, a payment token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a payment token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments or aspects, a payment token may be "format preserving" and may have a numeric format that conforms to the account identifiers used in existing payment processing networks (e.g., ISO 8583 financial transaction message format). In some non-limiting embodiments or aspects, a payment token may be used in place of a PAN to initiate, authorize, settle, or resolve a payment transaction or represent the original credential in other systems where the original credential would typically be provided. In some non-limiting embodiments or aspects, a token value may be generated such that the recovery of the original PAN or other account identifier from the token value may not be computationally derived (e.g., with a one-way hash or other cryptographic function). Further, in some non-limiting embodiments or aspects, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments or aspects of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments or aspects, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments or aspects, a requestor may interface with a network token system through any suitable communication network and/or protocol (e.g., using HTTPS, SOAP, and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments or aspects, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments or aspects, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments or aspects, token requestor identifiers may be revoked and/or token requestors may be assigned new token requestor identifiers. In some non-limiting embodiments or aspects, this information may be subject to reporting and audit by the token service provider.

As used herein, the term a "token service provider" may refer to an entity including one or more server computers in a token service system that generates, processes and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments or aspects, the token service provider may have the ability to set aside licensed BINs as token BINs to issue tokens for the PANs that may be submitted to the token service provider. In some non-limiting embodiments or aspects, various entities of a tokenization ecosystem may assume the roles of the token service provider. For example, payment networks and issuers or their agents may become the token service provider by implementing the token services according to non-limiting embodiments or aspects of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments or aspects, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments or aspects, the token vault may be a part of a token service system. For example, the token vault may be provided as a part of the token service provider. Additionally or alternatively, the token vault may be a remote repository accessible by the token service provider. In some non-limiting embodiments or aspects, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment device, an electronic payment device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. As used herein, the term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments or aspects of the disclosed subject matter are directed to systems, methods, and computer program products for authentication including, but not limited to, authentication based on at least one biometric input and/or at least one secret key. For example, non-limiting embodiments or aspects of the disclosed subject matter provide techniques and/or systems that enable building a secure yet usable authentication system that is transparent to the current password-authenticated servers (e.g., with limited and/or no modification on the server) and allows users to login from various devices with any of biometric or textual (e.g., password) inputs. Additionally or alternatively, non-limiting embodiments or aspects of the disclosed subject matter provide techniques and/or systems that enable generating a high entropy secret (e.g., second secret key) based on a password (e.g., which may be easily memorable to the user) and a (first) secret key (e.g., using device-enhanced password-authenticated key exchange (DE-PAKE)). Additionally or alternatively, non-limiting embodiments or aspects of the disclosed subject matter provide techniques and/or systems that enable sealing (e.g., encrypting) biometric data (e.g., using a fuzzy extractor generator) based on the secret (e.g., second secret key). Additionally or alternatively, non-limiting embodiments or aspects of the disclosed subject matter provide techniques and/or systems that enable reconstructing the secret (e.g., second secret key) using the (easily remembered) password (e.g., using DE-PAKE) or using a biometric input (e.g., using a fuzzy extractor opener). Additionally or alternatively, non-limiting embodiments or aspects of the disclosed subject matter provide techniques and/or systems that enable a user to authenticate (e.g., login and/or the like) using either a biometric input or textual password (e.g., depending on the availability of the biometric sensors on the user device being used for authentication) while providing security guarantees of a high entropy secret (that may be updated if needed). Additionally or alternatively, non-limiting embodiments or aspects of the disclosed subject matter provide techniques and/or systems that enable a user to authenticate with biometric information without exposing the stored biometric template and/or an encrypted/masked version thereof to the user's device, which may prevent an attacker from obtaining, recovering, or otherwise using the stored the biometric data in an attack.

For the purpose of illustration, in the following description, while the presently disclosed subject matter is described with respect to methods, systems, and computer program products for authentication, e.g., based on at least one biometric input and/or at least one secret key, one skilled in the art will recognize that the disclosed subject matter is not limited to the illustrative embodiments or aspects. For example, the methods, systems, and computer program products described herein may be used with a wide variety of settings, such as authentication in any setting suitable for using such authentication, e.g., transactions (e.g., payment transactions), account creation, account sign-in, application sign-in, and/or the like.

Referring now to FIG. 1, FIG. 1 is a diagram of a non-limiting embodiment or aspect of an environment 100 in which systems, products, and/or methods, as described herein, may be implemented. As shown in FIG. 1, environment 100 includes transaction service provider system 102, issuer system 104, customer device 106, merchant system 108, acquirer system 110, and network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider, as described herein. In some non-limiting embodiments or aspects, transaction service provider system 102 may be in communication with a data storage device, which may be local or remote to transaction service provider system 102. In some non-limiting embodiments or aspects, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments or aspects, issuer system 104 may be associated with an issuer institution, as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via network 112. Additionally or alternatively, each customer device 106 may include a device capable of receiving information from and/or communicating information to other customer devices 106 via network 112, another network (e.g., an ad hoc network, a local network, a private network, a virtual private network, and/or the like), and/or any other suitable communication technique. For example, customer device 106 may include a client device and/or the like. In some non-limiting embodiments or aspects, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via network 112, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant, as described herein. In some non-limiting embodiments or aspects, merchant system 108 may include one or more client devices. For example, merchant system 108 may include a client device that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments or aspects, acquirer system 110 may be associated with an acquirer, as described herein.

Network 112 may include one or more wired and/or wireless networks. For example, network 112 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

In some non-limiting embodiments or aspects, processing a transaction may include generating and/or communicating at least one transaction message (e.g., authorization request, authorization response, any combination thereof, and/or the like). For example, a client device (e.g., customer device 106, a POS device of merchant system 108, and/or the like) may initiate the transaction, e.g., by generating an authorization request. Additionally or alternatively, the client device (e.g., customer device 106, at least on device of merchant system 108, and/or the like) may communicate the authorization request. For example, customer device 106 may communicate the authorization request to merchant system 108 and/or a payment gateway (e.g., a payment gateway of transaction service provider system 102, a third-party payment gateway separate from transaction service provider system 102, and/or the like). Additionally or alternatively, merchant system 108 (e.g., a POS device thereof) may communicate the authorization request to acquirer system 110 and/or a payment gateway. In some non-limiting embodiments or aspects, acquirer system 110 and/or a payment gateway may communicate the authorization request to transaction service provider system 102 and/or issuer system 104. Additionally or alternatively, transaction service provider system 102 may communicate the authorization request to issuer system 104. In some non-limiting embodiments or aspects, issuer system 104 may determine an authorization decision (e.g., authorize, decline, and/or the like) based on the authorization request. For example, the authorization request may cause issuer system 104 to determine the authorization decision based thereof. In some non-limiting embodiments or aspects, issuer system 104 may generate an authorization response based on the authorization decision. Additionally or alternatively, issuer system 104 may communicate the authorization response. For example, issuer system 104 may communicate the authorization response to transaction service provider system 102 and/or a payment gateway. Additionally or alternatively, transaction service provider system 102 and/or a payment gateway may communicate the authorization response to acquirer system 110, merchant system 108, and/or customer device 106. Additionally or alternatively, acquirer system 110 may communicate the authorization response to merchant system 108 and/or a payment gateway. Additionally or alternatively, a payment gateway may communicate the authorization response to merchant system 108 and/or customer device 106. Additionally or alternatively, merchant system 108 may communicate the authorization response to customer device 106. In some non-limiting embodiments or aspects, merchant system 108 may receive (e.g., from acquirer system 110 and/or a payment gateway) the authorization response. Additionally or alternatively, merchant system 108 may complete the transaction based on the authorization response (e.g., provide, ship, and/or deliver goods and/or services associated with the transaction; fulfill an order associated with the transaction; any combination thereof, and/or the like).

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
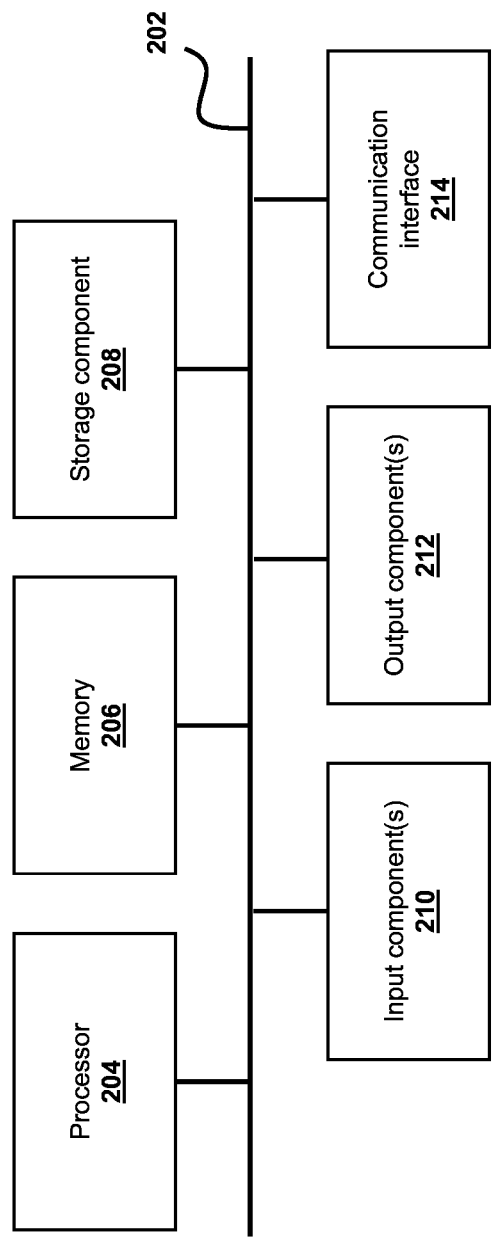
FIG. 2 is a diagram of a non-limiting embodiment or aspect of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments or aspects, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, firmware, and/or any combination thereof. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
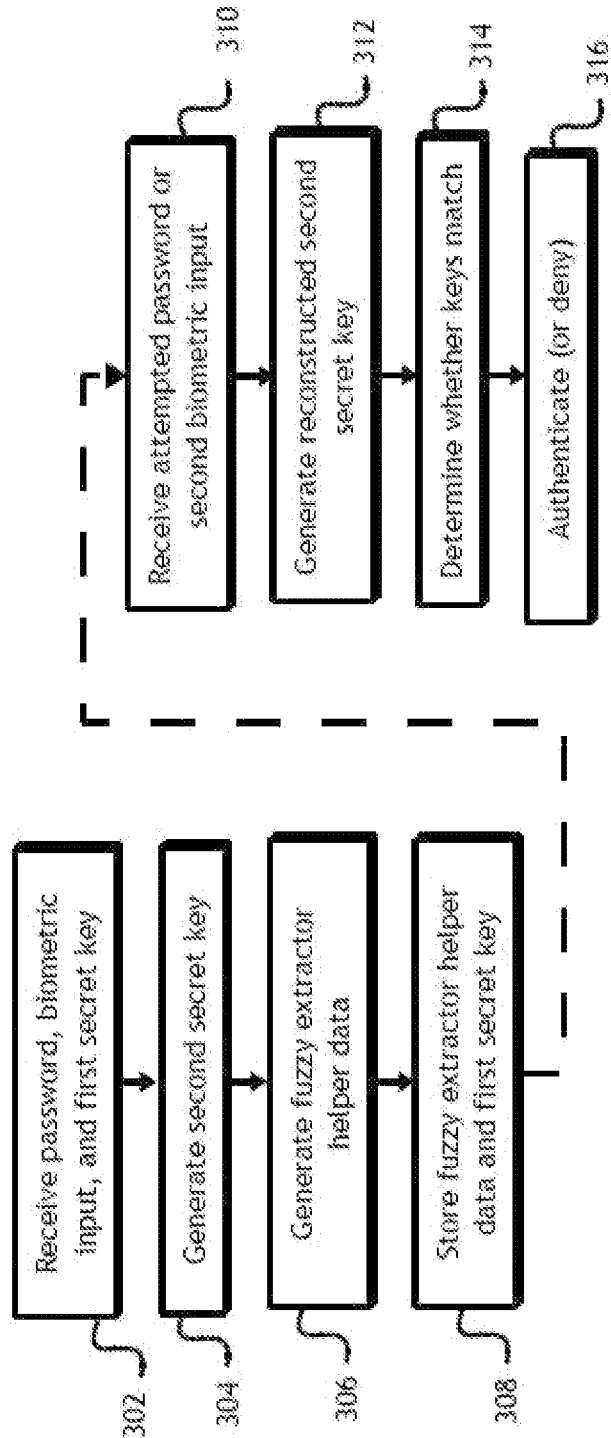
FIG. 3 is a flowchart of non-limiting embodiments or aspects of a process for authentication according to the principles of the presently disclosed subject matter.

Referring now to FIG. 3, FIG. 3 is a flowchart of a non-limiting embodiment or aspect of a process 300 for authentication. In some non-limiting embodiments or aspects, one or more of the steps of process 300 may be performed (e.g., completely, partially, and/or the like) by transaction service provider system 102 (e.g., one or more devices of transaction service provider system 102). In some non-limiting embodiments or aspects, one or more of the steps of process 300 may be performed (e.g., completely, partially, and/or the like) by another system, another device, another group of systems, or another group of devices, separate from or including transaction service provider system 102, such as issuer system 104 (e.g., one or more devices of issuer system 104), customer device 106 (e.g., one or more devices of customer device 106), merchant system 108 (e.g., one or more devices of merchant system 108), acquirer system 110 (e.g., one or more devices of acquirer system 110), and/or the like. In some non-limiting embodiments or aspects, with reference to FIG. 3, a server may be part of and/or implemented by (e.g., completely, partially, and/or the like) transaction service provider system 102, issuer system 104, merchant system 108, and/or acquirer system 110. In some non-limiting embodiments or aspects, with reference to FIG. 3, a user device may be the same as, similar to, and/or implemented (e.g., completely, partially, and/or the like) by customer device 106.

As shown in FIG. 3, at step 302, process 300 may include receiving first password data associated with a first password, first biometric input data associated with a first biometric input, and first secret key data associated with a first secret key, as described herein. For example, the password data and the first biometric input data may be received from and/or by a user device, as described herein. Additionally or alternatively, the first secret key data may be received from a server (e.g., a trusted third party server associated with a trusted third party and/or the like), as described herein.

In some non-limiting embodiments or aspects, the user device may include a trusted enrollment device. Additionally or alternatively, the server may include an authentication server.

As shown in FIG. 3, at step 304, process 300 may include generating a second secret key based on the first secret key and the first password, as described herein. In some non-limiting embodiments or aspects, the second secret key may be generated using device-enhanced password-authenticated key exchange (DE-PAKE), as described herein.

As shown in FIG. 3, at step 306, process 300 may include generating fuzzy extractor helper data based on the first biometric input and the second secret key, as described herein. In some non-limiting embodiments or aspects, the fuzzy extractor helper data may be generated using a fuzzy vault generator ($FV_{GEN}$), as described herein. For example, the fuzzy vault generator ($FV_{GEN}$) may include a two-party computation fuzzy vault generator ($FV_{GEN}$), as described herein.

In some non-limiting embodiments or aspects, the $FV_{GEN}$ may include extracting a plurality of first biometric data points from the first biometric input, generating a plurality of random data points, generating a polynomial encoding of each first biometric data point of the plurality of first biometric data points based on the second secret key, generating a random encoding of each random data point of the plurality of random data points, and combining the polynomial encoding of each first biometric data point of the plurality of first biometric data points and the random encoding of each random data point of the plurality of random data points into a set of encodings. Additionally or alternatively, the fuzzy extractor helper data may include the set of encodings.

In some non-limiting embodiments or aspects, the plurality of first biometric data points and the plurality of random data points may be combined to form a first set of data points. Additionally or alternatively, a respective set of neighboring data points may be generated for each respective data point of the first set of data points based on a threshold distance. Additionally or alternatively, each respective set of neighboring data points may be stored as a tuple with each respective data point in the first set of encodings.

In some non-limiting embodiments or aspects, the set of encodings may be permuted (e.g., randomly shuffled and/or the like) before storing the fuzzy extractor helper data including the set of encodings.

As shown in FIG. 3, at step 308, process 300 may include storing, with at least one processor, the fuzzy extractor helper data and the first secret key, as described herein.

As shown in FIG. 3, at step 310, process 300 may include receiving an attempted password and/or a second biometric input, as described herein. For example, attempted password data associated with an attempted password may be received. Additionally or alternatively, second biometric input data associated with a second biometric input may be received.

As shown in FIG. 3, at step 312, process 300 may include generating a reconstructed second secret key, as described herein. For example, a reconstructed second secret key may be generated based on the first secret key and the attempted password, as described herein. Additionally or alternatively, a reconstructed second secret key may be generated (e.g., obliviously generated and/or the like) based on the second biometric input and the fuzzy extractor helper data, as described herein.

In some non-limiting embodiments or aspects, the reconstructed second secret key may be generated using DE-PAKE, as described herein.

In some non-limiting embodiments or aspects, the reconstructed second secret key may be generated using a fuzzy vault opener ($FV_{OPEN}$), as described herein. For example, the fuzzy vault opener ($FV_{OPEN}$) may include a two-party computation fuzzy vault opener ($FV_{OPEN}^{2PC}$), as described herein.

For example, using the $FV_{OPEN}$ may include extracting a plurality of second biometric data points from the second biometric input, communicating the plurality of second biometric data points, receiving a plurality of polynomial encodings, and generating the reconstructed second secret key based on the plurality of polynomial encodings. Additionally or alternatively, each respective polynomial encoding of the plurality of polynomial encodings may be based on a respective second biometric data point of the plurality of second biometric data points. Additionally or alternatively, the fuzzy extractor helper data may include the plurality of polynomial encodings;

As shown in FIG. 3, at step 314, process 300 may include determining whether the reconstructed second secret key matches the second secret key, as described herein.

As shown in FIG. 3, at step 316, process 300 may include authenticating a user based on determining that the reconstructed second secret key matches the second secret key, as described herein. Additionally or alternatively, authentication of the user may be denied based on determining that the reconstructed second secret key does not match the second secret key.

Figure 4:
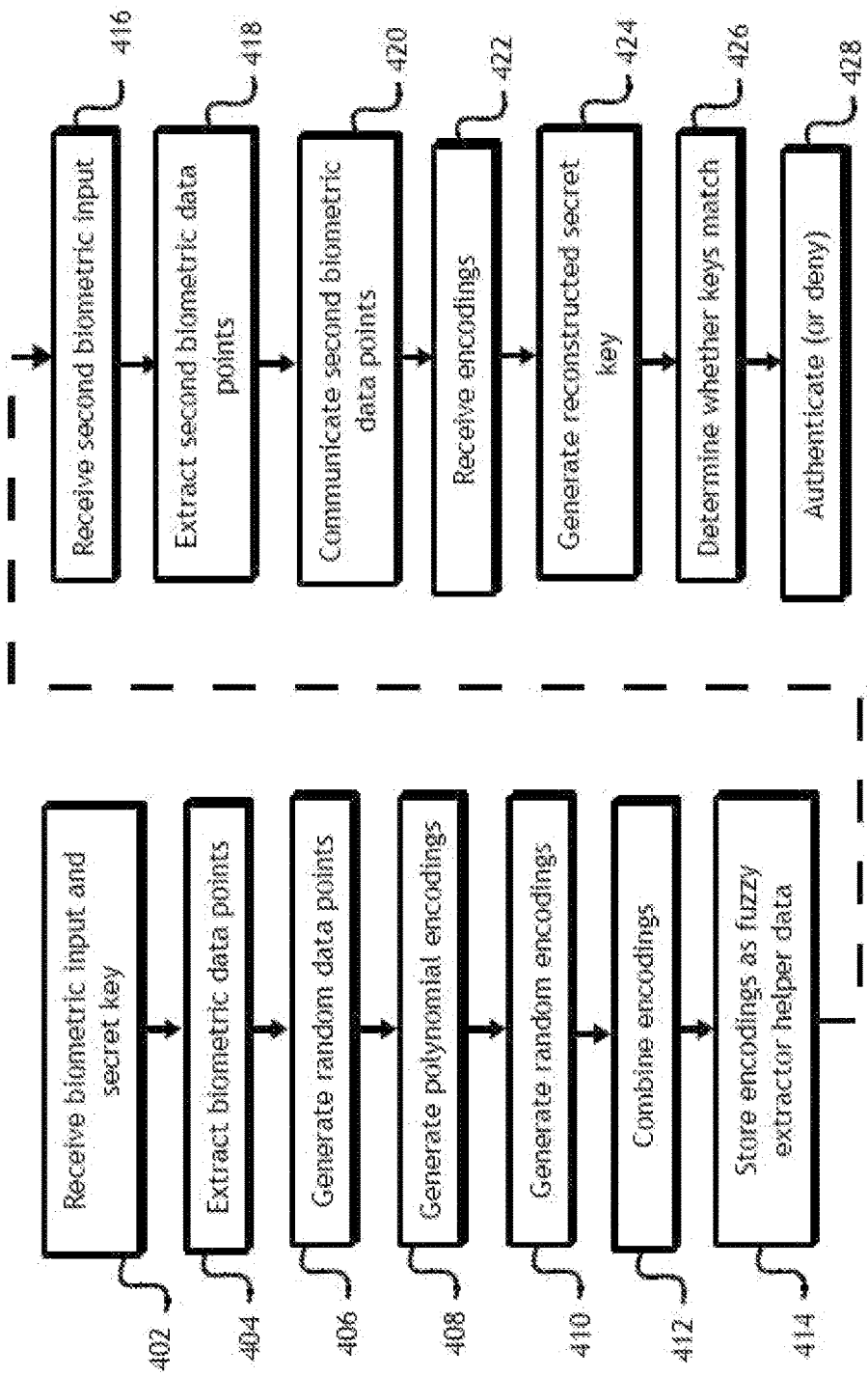
FIG. 4 is a flowchart of non-limiting embodiments or aspects of a process for authentication according to the principles of the presently disclosed subject matter.

Referring now to FIG. 4, FIG. 4 is a flowchart of a non-limiting embodiment or aspect of a process 400 for authentication. In some non-limiting embodiments or aspects, one or more of the steps of process 400 may be performed (e.g., completely, partially, and/or the like) by transaction service provider system 102 (e.g., one or more devices of transaction service provider system 102). In some non-limiting embodiments or aspects, one or more of the steps of process 400 may be performed (e.g., completely, partially, and/or the like) by another system, another device, another group of systems, or another group of devices, separate from or including transaction service provider system 102, such as issuer system 104 (e.g., one or more devices of issuer system 104), customer device 106 (e.g., one or more devices of customer device 106), merchant system 108 (e.g., one or more devices of merchant system 108), acquirer system 110 (e.g., one or more devices of acquirer system 110), and/or the like. In some non-limiting embodiments or aspects, with reference to FIG. 4, a server may be implemented (e.g., completely, partially, and/or the like) by transaction service provider system 102. In some non-limiting embodiments or aspects, with reference to FIG. 4, a user device may be implemented (e.g., completely, partially, and/or the like) by customer device 106.

As shown in FIG. 4, at step 402, process 400 may include receiving first biometric input data associated with a first biometric input and first secret key data associated with a first secret key, as described herein.

As shown in FIG. 4, at step 404, process 400 may include extracting a plurality of first biometric data points from the first biometric input, as described herein.

As shown in FIG. 4, at step 406, process 400 may include generating a plurality of random data points, as described herein.

In some non-limiting embodiments or aspects, the plurality of first biometric data points and the plurality of random data points may be combined to form a first set of data points. Additionally or alternatively, a respective set of neighboring data points may be generated for each respective data point of the first set of data points based on a threshold distance.

As shown in FIG. 4, at step 408, process 400 may include generating a polynomial encoding of each first biometric data point of the plurality of first biometric data points based on the first secret key, as described herein.

As shown in FIG. 4, at step 410, process 400 may include generating a random encoding of each random data point of the plurality of random data points, as described herein.

As shown in FIG. 4, at step 412, process 400 may include combining the polynomial encoding of each first biometric data point of the plurality of first biometric data points and the random encoding of each random data point of the plurality of random data points into a set of encodings, as described herein.

In some non-limiting embodiments or aspects, each respective set of neighboring data points may be stored as a tuple with each respective data point in the set of encodings.

In some non-limiting embodiments or aspects, the set of encodings may be permuted (e.g., randomly shuffled and/or the like).

As shown in FIG. 4, at step 414, process 400 may include storing the set of encodings as fuzzy extractor helper data, as described herein.

As shown in FIG. 4, at step 416, process 400 may include receiving second biometric input data associated with a second biometric input, as described herein.

As shown in FIG. 4, at step 418, process 400 may include extracting a plurality of second biometric data points from the second biometric input, as described herein.

As shown in FIG. 4, at step 420, process 400 may include communicating the plurality of second biometric data points, as described herein.

As shown in FIG. 4, at step 422, process 400 may include receiving a plurality of encodings, as described herein. In some non-limiting embodiments or aspects, each respective encoding of the plurality of encodings may be based on a respective second biometric data point of the plurality of second biometric data points. Additionally or alternatively, the set of encodings of the fuzzy extractor helper data may include the plurality of encodings.

As shown in FIG. 4, at step 424, process 400 may include generating a reconstructed first secret key based on the plurality of polynomial encodings, as described herein.

As shown in FIG. 4, at step 426, process 400 may include determining whether the reconstructed first secret key matches the first secret key, as described herein.

As shown in FIG. 4, at step 428, process 400 may include authenticating a user based on determining that the reconstructed first secret key matches the first secret key, as described herein. Additionally or alternatively, authentication of the user may be denied based on determining that the reconstructed second secret key does not match the second secret key.

Figure 5A:
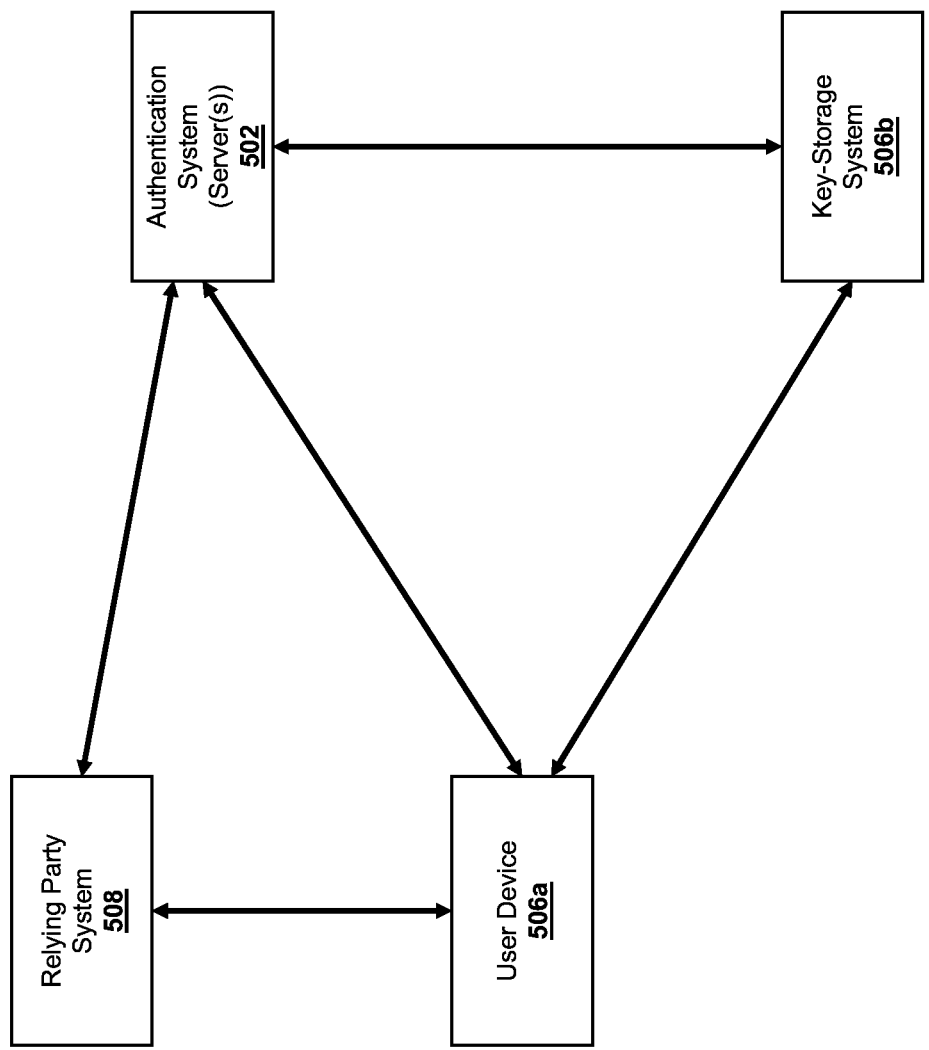
FIG. 5A is a diagram of non-limiting embodiments or aspects of an implementation of a non-limiting embodiment or aspect of a process for authentication according to the principles of the presently disclosed subject matter.

Referring to FIG. 5A, FIG. 5A is a diagram of an exemplary implementation 500 of a non-limiting embodiment or aspect of a process for authentication. As shown in FIG. 5A, implementation 500 may include authentication system 502, user device 506a, key-storage system 506b, and relying party system 508. In some non-limiting embodiments or aspects, authentication system 502 may be the same as, similar to, part of, and/or implemented by (e.g., completely, partially, and/or the like) transaction service provider system 102. Additionally or alternatively, authentication system 502 may be the same as, similar to, part of, and/or implemented by (e.g., completely, partially, and/or the like) another system, another device, another group of systems, or another group of devices, separate from transaction service provider system 102, such as issuer system 104, merchant system 108, acquirer system 110, and/or the like. In some non-limiting embodiments or aspects, user device 506a may be the same as, similar to, and/or implemented by (e.g., completely, partially, and/or the like) customer device 106 (e.g., a first customer device 106). In some non-limiting embodiments or aspects, key-storage system 506b may be the same as, similar to, and/or implemented by (e.g., completely, partially, and/or the like) a second customer device 106. Additionally or alternatively, key-storage system 506b may be the same as, similar to, and/or implemented by (e.g., completely, partially, and/or the like) a trusted third party server. In some non-limiting embodiments or aspects, relying party system 508 may be the same as, similar to, part of, and/or implemented by (e.g., completely, partially, and/or the like) merchant system 108. Additionally or alternatively, authentication system 502 may be the same as, similar to, part of, and/or implemented by (e.g., completely, partially, and/or the like) another system, another device, another group of systems, or another group of devices, separate from transaction merchant system 108, such as transaction service provider system 102, issuer system 104, acquirer system 110, and/or the like In some non-limiting embodiments or aspects, user device 506a may receive first password data associated with a first password, first biometric input data associated with a first biometric input, and first secret key data associated with a first secret key. For example, user device 506a may receive the password data and the first biometric input data may be received as input from a user of user device 506a. Additionally or alternatively, user device 506a may receive the first secret key data from key-storage system 506b. Additionally or alternatively, user of user device 506a may generate the first secret key.

In some non-limiting embodiments or aspects, user of user device 506a may include a trusted enrollment device.

In some non-limiting embodiments or aspects, user device 506a and/or key-storage device 506b may generate a second secret key based on the first secret key and the first password. For example, the second secret key may be generated using DE-PAKE (e.g., a password-to-random (PTR) protocol thereof), as described herein.

In some non-limiting embodiments or aspects, user device 506a and/or authentication system 502 may generate fuzzy extractor helper data based on the first biometric input and a secret key (e.g., the second secret key). For example, the fuzzy extractor helper data may be generated using an $FV_{GEN}$ (e.g., a two-party computation fuzzy vault generator ($FV_{GEN}^{2PC}$)), as described herein.

In some non-limiting embodiments or aspects, the $FV_{GEN}$ may include extracting a plurality of first biometric data points from the first biometric input, generating a plurality of random data points, generating a polynomial encoding of each first biometric data point of the plurality of first biometric data points based on the second secret key, generating a random encoding of each random data point of the plurality of random data points, and combining the polynomial encoding of each first biometric data point of the plurality of first biometric data points and the random encoding of each random data point of the plurality of random data points into a set of encodings. Additionally or alternatively, the fuzzy extractor helper data may include the set of encodings.

In some non-limiting embodiments or aspects, the plurality of first biometric data points and the plurality of random data points may be combined to form a first set of data points. Additionally or alternatively, a respective set of neighboring data points may be generated for each respective data point of the first set of data points based on a threshold distance. Additionally or alternatively, each respective set of neighboring data points may be stored as a tuple with each respective data point in the first set of encodings.

In some non-limiting embodiments or aspects, the set of encodings may be permuted (e.g., randomly shuffled and/or the like) before storing the fuzzy extractor helper data including the set of encodings.

In some non-limiting embodiments or aspects, a fuzzy vault (FV) may include a fuzzy vault generator ($FV_{GEN}$), a fuzzy vault opener ($FV_{OPEN}$), and a set of parameters ($\varphi$). For example, the set of parameters ($\varphi$) may include a polynomial degree (d), a Galois Field (GF) size (e.g., a Galois Field of size $2_T$ ($GF(2_T)$), where T is a number of bits), a metric space (M), a distance function (dist) (e.g., defined over the metric space (M)), a distance threshold (w), any combination thereof, and/or the like. In some non-limiting embodiments or aspects, a fuzzy vault generator ($FV_{GEN}$) may receive as inputs thereto biometric data (e.g., a biometric template (BT) of a user) and a secret key (k). For example, the key (k) may be such that $|k|=(d+1)\times T$. In some non-limiting embodiments or aspects, the $FV_{GEN}$ may generate as output helper data (HD) based on the inputs. In some non-limiting embodiments or aspects, a fuzzy vault opener ($FV_{OPEN}$) may receive as inputs thereto the helper data (HD) and second biometric data (e.g., a purported biometric template (BT') of the user). In some non-limiting embodiments or aspects, the $FV_{OPEN}$ may generate as output a reconstructed key (k'). For example, the reconstructed key (k') may be such that $|k'|=(d+1)\times T$.

In some non-limiting embodiments or aspects, a BT corresponding to a user may be represented by BT= $\{p_1, \ldots, p_M\}$, where $p_1, \ldots, p_M$ are data points representing unique details of the user's biometric. For example, in a fingerprint BT, each $p_1 \in BT$ may represent the location and orientation of the fingerprint's minutiae (e.g., regions in the fingerprint image in which fingerprint lines merge and/or split). Additionally or alternatively, each minutiae point may be encoded as $p_i=(x_i, y_i, \theta_i)$, where, $x_i$ and $y_i$ may be horizontal and vertical Cartesian coordinates, respectively, and $\theta_i$ may be an angle representing the orientation of the minutiae $p_i$.

In some non-limiting embodiments or aspects, the fuzzy vault (FV) may include a two-party computation (2PC) fuzzy vault ($FV^{2PC}$). Additionally or alternatively, an $FV^{2PC}$ may include a two-party computation fuzzy vault generator ($FV_{GEN}^{2PC}$) and/or a two-party computation fuzzy vault opener ($FV_{OPEN}^{2PC}$), as described herein.

Referring now to FIG. 5B, and with continued reference to FIG. 5A, FIG. 5B is an exemplary swimlane diagram for a non-limiting embodiment or aspect of a two-party computation fuzzy vault generator ($FV_{GEN}^{2PC}$) relating to implementation 500 of FIG. 5A.

In some non-limiting embodiments or aspects, $FV_{GEN}^{2PC}$ may generate fuzzy vault helper data (HD) that may allow for efficient oblivious authentication, as further described below. In some non-limiting embodiments or aspects, $FV_{GEN}^{2PC}$ may be executed when the user first registers (e.g., using user device 506) with authentication system 502. In some non-limiting embodiments or aspects, user device 506a may be a trusted enrollment device (e.g., a device under the control of the organization deploying authentication system 502 and/or the like). Upon enrollment (e.g., upon execution of $FV_{GEN}^{2PC}$ and/or the like), authentication system 502 may store (e.g., persistently store) the HD in association with an identifier of the user (e.g., a username, user identifier ($U_{ID}$) and/or the like).

As shown in FIG. 5B, $FV_{GEN}^{2PC}$ may include user device 506a receiving inputs. For example, the inputs may include a user identifier ($U_{ID}$), first biometric input data (e.g., biometric template (BT)) associated with a first biometric input, first secret key data associated with a first secret key (K), any combination thereof, and/or the like. Additionally or alternatively, the inputs may include at least one parameter, such as a polynomial degree (d), a distance function (dist), a distance threshold (w), a number (m) of biometric data points (e.g., $bt_1$, $bt_m$), a number (n) of random data points (e.g., $c_1, \ldots, c_n$), any combination thereof, and/or the like. In some non-limiting embodiments or aspects, authentication system 502 may not need any inputs (but, as further describe below, authentication system 502 may receive certain information from user device 506).

As shown in FIG. 5B, at line 1, $FV_{GEN}^{2PC}$ may include extracting a plurality of first biometric data points from the first biometric input. For example, user device 506a may extract biometric data points from the biometric template (e.g., Ext(BT)={$bt_1, \ldots, bt_m$}). Additionally or alternatively, the extracted biometric data points may be stored in a first list ($L_m$).

As shown in FIG. 5B, at line 2, $FV_{GEN}^{2PC}$ may include may include generating a plurality of random data points. For example, user device 506a may generate random data points (e.g., {$c_1, \ldots, c_n$}). In some non-limiting embodiments or aspects, each random data point may be generated from a probability distribution (D). Additionally or alternatively, the generated random data points may be stored in a second list ($L_n$).

As shown in FIG. 5B, at line 3, $FV_{GEN}^{2PC}$ may include generating a random permutation. For example, user device 506a may generate a random permutation ($\Pi_S$) of m+n elements.

As shown in FIG. 5B, at line 4, $FV_{GEN}^{2PC}$ may include combining the plurality of first biometric data points and the plurality of random data points to form a first set of data points. For example, user device 506a may combine the first list ($L_m$) and the second list ($L_n$) to form a combined list (L).

As shown in FIG. 5B, at line 5, $FV_{GEN}^{2PC}$ may include generating a polynomial encoding of each first biometric data point of the plurality of first biometric data points based on the secret key and/or generating a random encoding of each random data point of the plurality of random data points. For example, user device 506a may encode the secret key (K) as the coefficients of a polynomial $P_k(.)$, which may have a degree d.

As shown in FIG. 5B, at line 6, $FV_{GEN}^{2PC}$ may include initializing an empty set. For example, user device 506a may initialize an empty list (S).

As shown in FIG. 5B, at line 7, $FV_{GEN}^{2PC}$ may include combining the polynomial encoding of each first biometric data point of the plurality of first biometric data points and the random encoding of each random data point of the plurality of random data points into a set of encodings. For example, user device 506a may combine these items into the previously initialized set (S) as follows.

In some non-limiting embodiments or aspects, a respective set of neighboring data points may be generated for each respective data point of the first set of data points (e.g., each biometric data point and each random data point in combined list L) based on the threshold distance (d). For example, for each point e in the list L (e.g., $e \in L = L_m + L_n$), user device 506a may generate the set of all points (x) that are within the distance threshold (w) from e (e.g., {x|dist(x,e)≤w}), which may be stored in a neighbor set $s_e$. In some non-limiting embodiments or aspects, e may be selected from the set $\mathbb{Z}_p$ (e.g., $e \in \mathbb{Z}_p$), which may be finite. In some non-limiting embodiments or aspects, each respective data point in the set of encodings may be stored (e.g., by user device 506) as a tuple with the respective set of neighboring data points and/or the respective polynomial encoding. For example, a tuple (e, $p_e$) may be generated (e.g., by user device 506) for each e. Additionally or alternatively, each respective tuple may be associated with the respective set of neighboring data points (e.g., [$s_e$, (e, $p_e$)]). In some non-limiting embodiments or aspects, if the respective e is a biometric data point (e.g., $e \in L_m$), the respective $p_e$ (e.g., in the tuple with the respective e) may include the polynomial encoding of the respective biometric data point (e.g., $p_e = P_k(e)$). Additionally or alternatively, if the respective e is a random data point (e.g., $e \in L_n$), the respective $p_e$ (e.g., in the tuple with the respective e) may include the random encoding of the respective random data point (e.g., $p_e = s\mathbb{Z}_p$). In some non-limiting embodiments or aspects, each biometric data point (e.g., $e \in L_m$) may be associated with a Shamir secret share of the key (K), and/or the shares of K and the random tuples may be indistinguishable given randomness of K. In some non-limiting embodiments or aspects, each of the elements [$s_e$, (e, $p_e$)] for neighbor set ($s_e$) and tuple (e, $p_e$) may be added to the set (S).

As shown in FIG. 5B, at line 8, $FV_{GEN}^{2PC}$ may include permuting (e.g., randomly shuffling and/or the like) the set of encodings. For example, the set (S) may be shuffled (e.g., by user device 506) using the random permutation (e.g., $\Pi(S)$). In some non-limiting embodiments or aspects, the shuffled set may be stored as a dataset (D).

As shown in FIG. 5B, at line 9, $FV_{GEN}^{2PC}$ may include communicating the set (S) (and/or the dataset (D) based on shuffling the set (S)), e.g., from user device 506a to authentication system 502. For example, user device 506a may communicate the dataset (D) to authentication system 502. Additionally or alternatively, user device 506a may communicate other information in addition to the dataset (D), such as the user identifier ($U_{ID}$) and/or key data associated with the key (K). In some non-limiting embodiments or aspects, the key data may include K. Additionally or alternatively, the key data may include at least one hash based on the key (e.g., a first hash ($H_1(K)$), a second hash ($H_2(K)$), and/or the like). In some non-limiting embodiments or aspects, the hash(es) based on the key (K) may enable challenge-response based authentication, as described herein.

As shown in FIG. 5B, at lines 9-11, $FV_{GEN}^{2PC}$ may include storing the set (S) (and/or the dataset (D) based on shuffling the set (S)) of encodings as fuzzy extractor helper data (HD). For example, authentication system 502 may store the HD. In some non-limiting embodiments or aspects, the HD may further include at least some of the other information received from user device 506a, such as the user identifier ($U_{ID}$), key data associated with the key (K) (e.g., a first hash ($H_1(K)$), a second hash ($H_2(K)$), and/or the like), any combination thereof, and/or the like. In some non-limiting embodiments or aspects, authentication system 502 may fill up the dataset (D) before storing the dataset (D) as part of the HD.

With continued reference to FIG. 5A, in some non-limiting embodiments or aspects, authentication system 502 may receive an attempted password and/or a second biometric input from user device 506a. For example, attempted password data associated with an attempted password may be received by authentication system 502 from user device 506a. Additionally or alternatively, second biometric input data associated with a second biometric input may be received by authentication system 502 from user device 506a.

In some non-limiting embodiments or aspects, authentication system 502 may generate a reconstructed second secret key. For example, authentication system 502 may generate a reconstructed second secret key based on the first secret key and the attempted password. Additionally or alternatively, authentication system 502 may generate (e.g., obliviously generate and/or the like) a reconstructed second secret key based on the second biometric input and the fuzzy extractor helper data.

In some non-limiting embodiments or aspects, the reconstructed second secret key may be generated using a fuzzy vault opener ($FV_{OPEN}$). For example, using the $FV_{OPEN}$ may include extracting a plurality of second biometric data points from the second biometric input, communicating the plurality of second biometric data points, receiving a plurality of polynomial encodings, and generating the reconstructed second secret key based on the plurality of polynomial encodings. Additionally or alternatively, each respective polynomial encoding of the plurality of polynomial encodings may be based on a respective second biometric data point of the plurality of second biometric data points. Additionally or alternatively, the fuzzy extractor helper data may include the plurality of polynomial encodings.

Figure 5C:
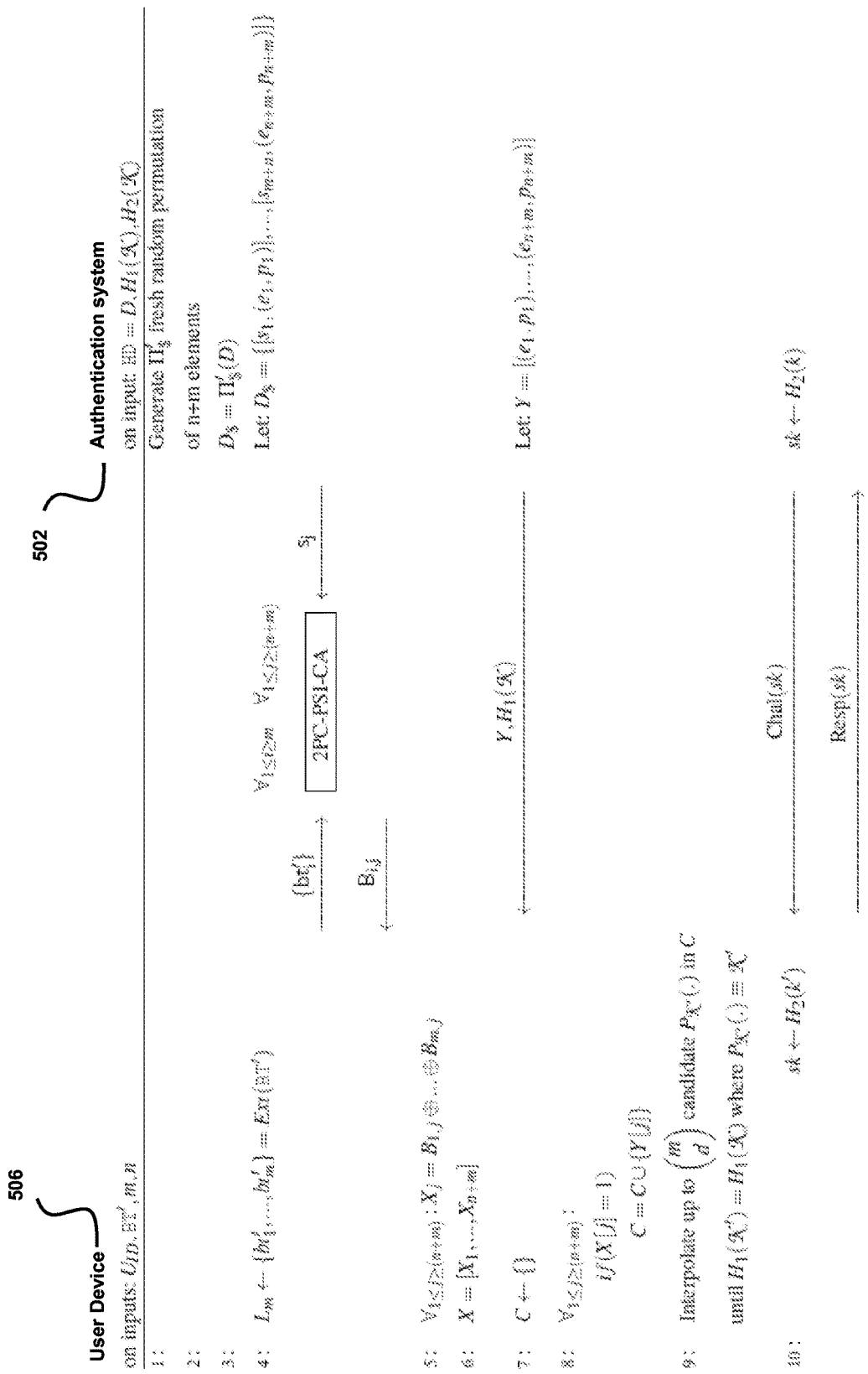
FIG. 5C is a swimlane diagram for non-limiting embodiments or aspects of a two-party computation fuzzy vault opener ($FV_{OPEN}^{2PC}$) relating to the implementation of FIG. 5A according to the principles of the presently disclosed subject matter.

Referring now to FIG. 5C, and with continued reference to FIG. 5A, FIG. 5C is an exemplary swimlane diagram for a non-limiting embodiment or aspect of a two-party computation fuzzy vault opener ($FV_{OPEN}^{2PC}$) relating to implementation 500 of FIG. 5A. In some non-limiting embodiments or aspects, the $FV_{OPEN}^{2PC}$ may enable user device 506a to recover the key (K) obliviously.

As shown in FIG. 5C, $FV_{OPEN}^{2PC}$ may include user device 506a receiving inputs. For example, the inputs for user device 506a may include a user identifier ($U_{ID}$), second biometric input data (e.g., second biometric template (BT')), a number (m) of biometric data points (e.g., $bt'_1$, $bt'_m$), a number (n) of random data points, any combination thereof, and/or the like. Additionally or alternatively, authentication system 502 may receive and/or may store inputs. For example, the inputs for authentication system 502 may include the fuzzy vault helper data (HD) stored as described in FIG. 5B As shown in FIG. 5C, at lines 1 and 2, $FV_{OPEN}^{2PC}$ may include generating a second random permutation. For example, authentication system 502 may generate the second random permutation ($\Pi'$s) of m+n elements.

As shown in FIG. 5C, at line 3, $FV_{OPEN}^{2PC}$ may include permuting (e.g., randomly shuffling and/or the like) the dataset (D) of the HD. For example, the dataset (D) may be shuffled (e.g., by authentication system 502) using the second random permutation (e.g., $\Pi'_S(D)$). In some non-limiting embodiments or aspects, the shuffled set may be stored as a shuffled dataset ($D_S$). In some non-limiting embodiments or aspects, the shuffled dataset ($D_S$) may include elements (e.g., [$s_i$, ($e_i$, $p_i$)] for neighbor set ($s_i$) and tuple ($e_i$, $p_i$) for i from 1 to m+n).

As shown in FIG. 5C, at line 4, $FV_{OPEN}^{2PC}$ may include extracting a plurality of second biometric data points from the second biometric input. For example, user device 506a may extract second biometric data points from the second biometric template (e.g., Ext(BT')={$bt'_1$, ..., $bt'_m$}). Additionally or alternatively, the extracted biometric data points may be stored in a first list ($L_m$).

In some non-limiting embodiments or aspects, after obtaining the second biometric data points $bt'_i \in L_m$, user device 506a and authentication system 502 may communicate using a private set intersection (PSI) protocol to determine whether the second biometric data points ($bt'_i$) correspond to any of the elements (e.g., the neighbor sets $s_j$) of the shuffled dataset $D_S$. For example, the PSI protocol may include a two party computation PSI-Cardinality (2PC-PCI-CA) protocol to determine the set intersection cardinality between each second biometric data point ($bt'_i$) and a respective neighbor set $s_j$ (if any). For example, based on the inputs of the second biometric data points ($bt'_i$) and the neighbor sets ($s_j$), the result of the 2PC-PCI-CA may include a binary value 1 if dist($bt'_i$, e)<w (where e is the (first) biometric data point used to generate the respective neighbor set) and a binary value of 0 otherwise. As such, user device 506a may receive a plurality of encodings (a set of encodings ($B_{ij}$)), e.g., based on the respective second biometric data points and/or the shuffled dataset.

As shown in FIG. 5C, at lines 5 and 6, $FV_{OPEN}^{2PC}$ may include learning an intersection set (X) based on the set of encodings (BO. For example, each intersection data point ($X_j$) of the intersection set (X) may include the sum of the respective subset (e.g., $B_{1j}$ + ... + $B_{mj}$) of the set of encodings ($B_{ij}$), for all values of j from 1 to m+n. In some non-limiting embodiments or aspects, the intersection set (X) may be associated with positions in the HD that contain points that are close enough (e.g., within the threshold distance w) to each $bt'_i \in L_m$.

As shown in FIG. 5C, at line 7, $FV_{OPEN}^{2PC}$ may include authentication system 502 communicating (e.g., to user device 506a) a tuple set (Y) (e.g., a set of all tuples (e, $p_e$)), which may be in the same order as the neighbor sets ($s_j$) from the shuffled dataset ($D_S$). Additionally or alternatively, user device 506a may initialize and empty candidate set (C). In some non-limiting embodiments or aspects, authentication system 502 may also communicate a first hash of the secret key ($H_1$ (K)) (e.g., to user device 506a).

As shown in FIG. 5C, at line 8, $FV_{OPEN}^{2PC}$ may include populating the candidate set (C) based on the intersection set (X) and the tuple set (Y). For example, user device 506a may determine which tuples in the tuple set (Y) are most likely shares of the secret key (K) based on the intersection set (X). For example, for all values of j from 1 to m+n, if $X_j$ is 1, the respective tuple (Yj) from the tuple set (Y) may be added to the candidate set (C). As such, the tuples added to the candidate set (C) may be considered likely to be shares of the secret key (K).

As shown in FIG. 5C, at line 8, $FV_{OPEN}^{2PC}$ may include generating a reconstructed secret key based on polynomial encodings. For example, user device 506a may interpolate up to $\binom{m}{d}$ candidate polynomial encodings $P_K(.)$ based on the candidate set (C), where each $P_K(.)$ may be a candidate reconstructed secret key. For example, user device 506a may perform such interpretation until a first hash of candidate reconstructed secret key ($H_1(K')$) equals the first hash of the first secret key ($H_1(K)$) (e.g., received from authentication system 502). The candidate reconstructed secret key may be the reconstructed secret key (K').

In some non-limiting embodiments or aspects, if the second biometric template (BT') contained at least d+1 matching features (e.g., second biometric data points within the threshold distance from the first biometric data points), user device 506a may be able to recover the secret key (K) (e.g., generate the reconstructed secret key (K') equivalent to the secret key (K)).

As shown in FIG. 5B, at line 10, $FV_{GEN}^{2PC}$ may include determining whether the reconstructed secret key (K') matches the secret key (K) and/or authenticating a user based on that determination (or denying authentication if the keys do not match). For example, authentication system 502 (and/or relying party system 508) may authenticate user device 506a based on a challenge-response protocol. For example, authentication system 502 (and/or relying party system 508) may communicate a challenge based on the second hash of the secret key ($H_2(K)$) to user device 506a. In response to the challenge, user device 506a may communicate a response based on a second hash of the reconstructed secret key ($H_2(K')$) to authentication system 502 (and/or relying party system 508). If the response to the challenge is successful, authentication system 502 (and/or relying party system 508) may determine that the keys match and/or authenticate user device 506a.

With continued reference to FIG. 5A, in some non-limiting embodiments or aspects, user device 506a may use the secret key to authenticate with authentication system 502 and/or relying party system 508. For example, the secret key may be registered as a password with authentication system 502 and/or relying party system 508. Additionally or alternatively, the secret key may be used to encrypt a plurality of per-system keys and/or per-device keys (e.g., with a plurality of relying party systems 508 and/or a plurality of devices thereof), respectively. Additionally or alternatively, the secret key may be used as a payment token. Additionally or alternatively, the secret key may be used as input to a password-authenticated key exchange (PAKE) protocol (e.g., DE-PAKE and/or the like).

In some non-limiting embodiments or aspects, a reconstructed second secret key may be generated using DE-PAKE. For example, in DE-PAKE, a user may memorize a regular password (pwd). Additionally or alternatively, the password (pwd) may be input into user device 506a. In some non-limiting embodiments or aspects, user device 506a may communicate with key-storage system 506b to generate a randomized password (rwd). For example, user device 506a may communicate with key-storage system 506b using a password-to-random (PTR) protocol to generate $rwd = F_{k1}(pwd)$, where F is a pseudorandom function and k1 is a first secret key held by key-storage system 506b. Additionally or alternatively, user device 506a may authenticate to authentication system 502 (and/or relying party system 508) using a standard PAKE protocol with rwd as a password. In some non-limiting embodiments or aspects, rwd may be considered a second secret key (k2).

In some non-limiting embodiments or aspects, the DE-PAKE protocol may be the same as or similar to the protocol described in S. Jarecki et al., *Device-Enhanced Password Protocols with Optimal Online-Offline Protection*, ACM Asia Conference on Computer and Communications Security (ASIA CCS'16) (2016), the disclosure of which is incorporated by reference herein in its entirety.

In some non-limiting embodiments or aspects, the second secret key (k2) may be used as the secret key (K) for an FV (e.g., $FV_{GEN}^{2PC}$ and/or $FV_{OPEN}^{2PC}$), as described herein.

In some non-limiting embodiments or aspects, authentication system 502 may serve as an oblivious extractor, e.g., that may efficiently authenticate a user without requiring user device 506a to send biometric data (e.g., clear biometric data and/or the like) to authentication system 502 and/or without authentication system 502 sending biometric data (e.g., clear biometric data, encrypted and/or masked biometric data, and/or the like) to the user device 506a. Additionally or alternatively, authentication system 502 (e.g., oblivious extractor) may be computationally efficient and provide concrete security advantages for biometric-based authentication. For example, from the perspective of secure storage, authentication system 502 (e.g., oblivious extractor) may be as secure as a non-oblivious extractor (e.g., fuzzy extractor), and/or authentication system 502 (e.g., oblivious extractor) may enhance security against attacks (e.g., biometric data recovery attacks, statistical attacks, re-usability attacks, and/or the like).

In some non-limiting embodiments or aspects, user device 506a and/or authentication system 502 may be compatible with any distance function for any type of biometric data, which may make user device 506a and/or authentication system 502 flexible and applicable to any type of biometrics (e.g., fingerprints, iris scans, facial recognition, and/or the like).

In some non-limiting embodiments or aspects, user device 506a and/or authentication system 502 may not rely on specialized secure hardware to perform the biometric matching (e.g., unlike systems in which a biometric template is stored in clear by a secure hardware module and/or the matching is performed in clear during authentication). As such, user device 506a and/or authentication system 502 may not rely on the assumptions that secure hardware cannot be breached and/or that the manufacturer of such hardware can be trusted not to violate the user's privacy. Moreover, by not relying on specialized secure hardware, user device 506a and/or authentication system 502 may be easily scalable, e.g., to settings with multiple user devices and/or multiple authentication systems, such as enterprise settings.

In some non-limiting embodiments or aspects, user device 506a may not be required to be the same device (or a limited set of device(s)) every time the user wishes to authenticate. For example, if authentication system 502 is associated with a company that uses biometric-based authentication to grant physical access to buildings and the users are the employees, the buildings might be geographically distributed and, therefore, users must be able to authenticate from different physical (and/or logical) entry points. As such, multiple user devices 506a may be deployed, and/or each such user device 506a may be stateless.

Figure 6A:
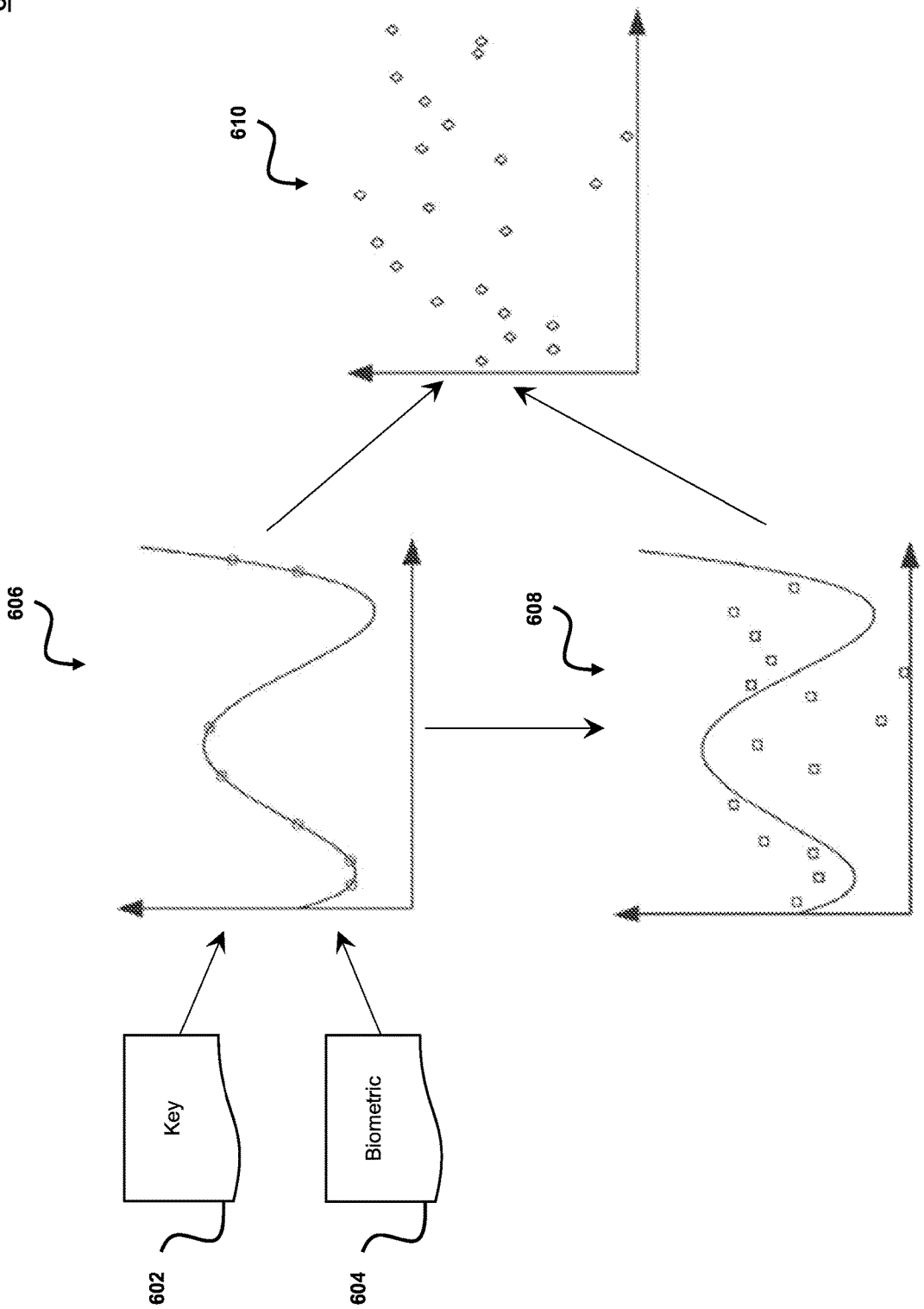
FIGS. 6A-6B are diagrams of non-limiting embodiments or aspects of an implementation of non-limiting embodiments or aspects of a process for authentication according to the principles of the presently disclosed subject matter.
Figure 6B:
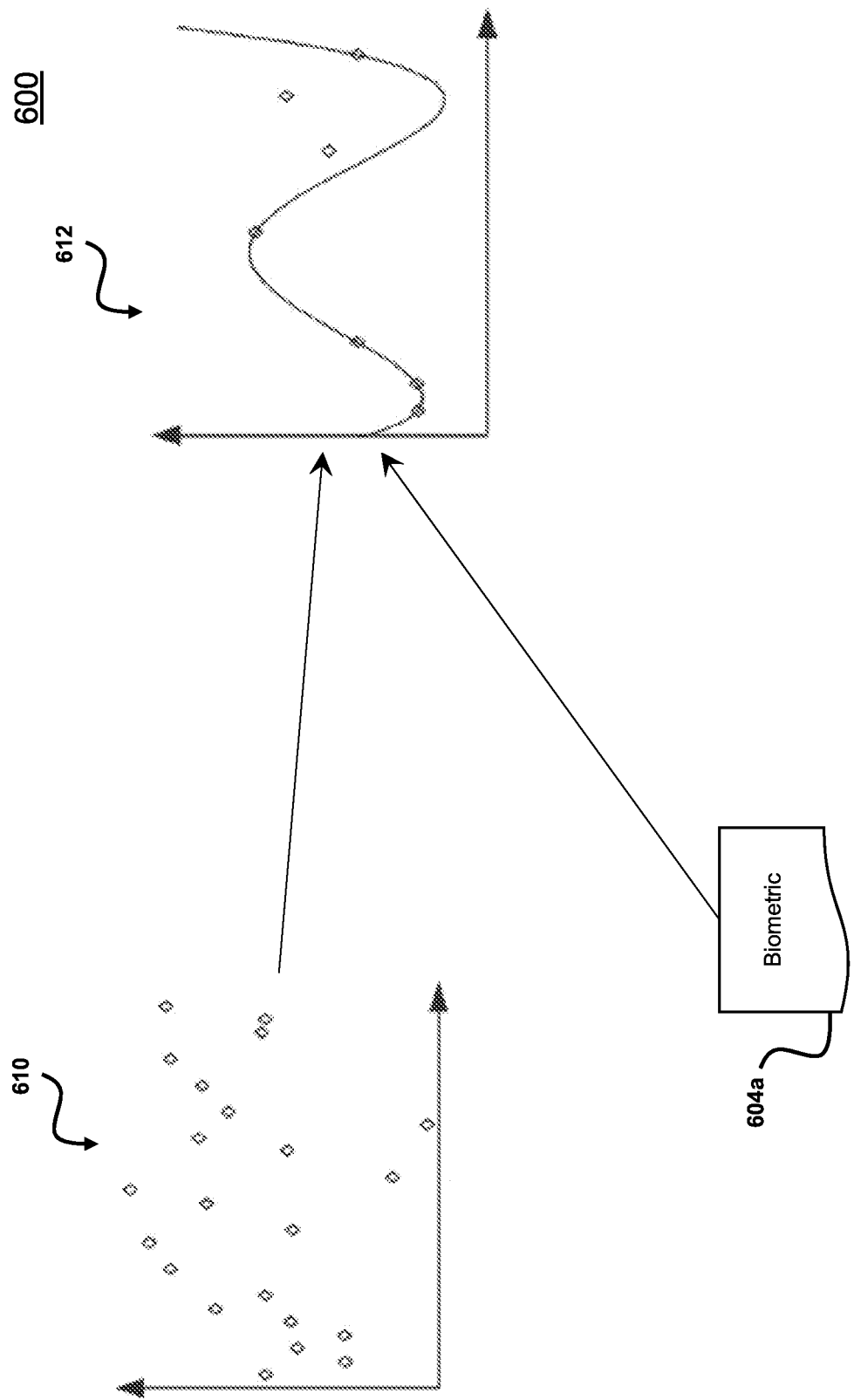

Referring to FIGS. 6A and 6B, FIGS. 6A and 6B are diagrams of an exemplary implementation 600 of a non-limiting embodiment or aspect of a process for authentication.

In some non-limiting embodiments or aspects, as shown in FIG. 6A, a key 602 and biometric data 604 may be used to generate at least one polynomial encoding 606, as described herein. Additionally or alternatively, a plurality of random data points 608 may be generated, as described herein. Additionally or alternatively, fuzzy vault helper data 610 may be generated and/or stored based on polynomial encoding(s) 606 and/or random data points 608, as described herein.

In some non-limiting embodiments or aspects, as shown in FIG. 6B, upon receipt of second biometric data 604*a*, fuzzy vault helper data 610 and second biometric data 604*a* may be used to generate at least one candidate polynomial encoding 612, as described herein. For example, the candidate polynomial encoding(s) 612 may be used to generate a reconstructed key, as described herein.

Figure 7:
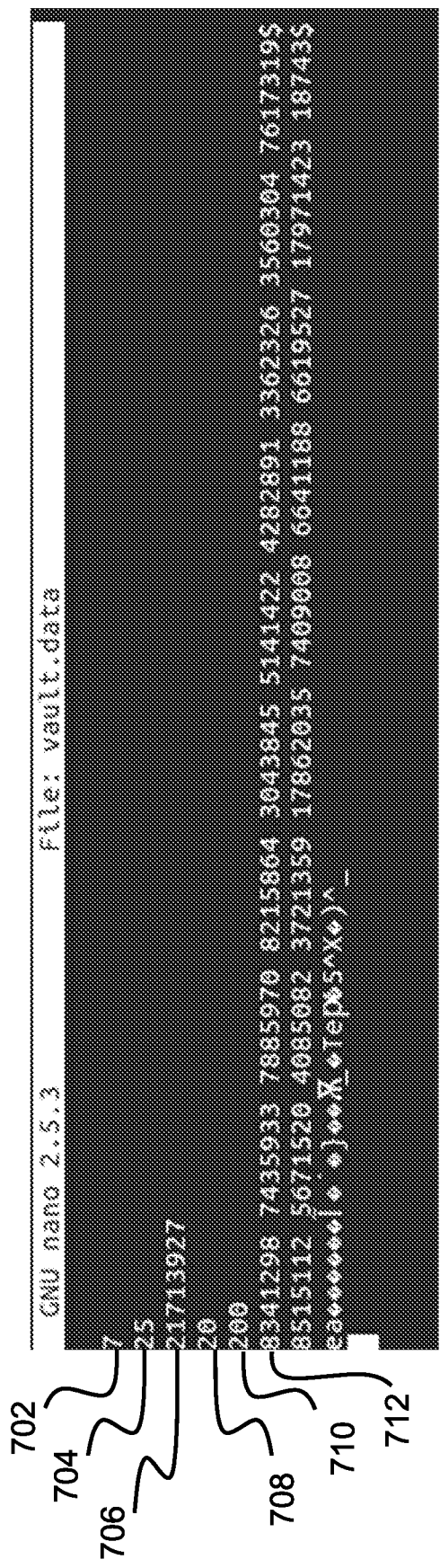
FIG. 7 is a screenshot of non-limiting embodiments or aspects of an implementation of non-limiting embodiments or aspects of a process for generating fuzzy extractor helper data according to the principles of the presently disclosed subject matter.

Referring to FIG. 7, FIG. 7 is a screenshot of an exemplary implementation of a non-limiting embodiment or aspect of a process for generating fuzzy extractor helper data according to the principles of the presently disclosed subject matter.

In some non-limiting embodiments or aspects, the fuzzy extractor helper data may be generated based on a plurality of parameters, as described herein. For example, polynomial degree 702, field size 704 (e.g., GF size), field prime 706, number of evaluation points 708 (e.g., biometric data points), number of random data points 710 (e.g., chaff points), any combination thereof, and/or the like, may be used to generate help data 712, as described herein. In some non-limiting embodiments or aspects, the size of the secret key (K) may be equal to the product of field size 704 and the sum of polynomial degree 702 and one (e.g., secret key size=field size*(degree+1)).

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment or aspect can be combined with one or more features of any other embodiment or aspect.

What is claimed is:

1. A computer-implemented method, comprising:
receiving, with at least one processor, first password data associated with a first password, first biometric input data associated with a first biometric input, and first secret key data associated with a first secret key;
generating, with at least one processor, a second secret key using the first secret key, the first password, and a password-to-random protocol;
generating, with at least one processor, fuzzy extractor helper data using the first biometric input and the second secret key;
storing, with at least one processor, the fuzzy extractor helper data and the first secret key;
receiving, with at least one processor, one of attempted password data associated with an attempted password or second biometric input data associated with a second biometric input; and
obliviously generating, with at least one processor, a reconstructed second secret key using the first secret key and the attempted password in response to receiving the attempted password data or using the second biometric input and the fuzzy extractor helper data in response to receiving the second biometric input.

2. The method of claim 1, wherein receiving comprises receiving the password data and the first biometric input data from a user device and receiving the first secret key data from a server.

3. The method of claim 2, wherein the user device comprises a trusted enrollment device and the server comprises an authentication server.

4. The method of claim 1, further comprising:
determining, with at least one processor, that the reconstructed second secret key matches the second secret key; and
authenticating, with at least one processor, a user based on determining the reconstructed second secret key matches the second secret key.

5. The method of claim 4, wherein generating the reconstructed second secret key comprises generating the reconstructed second secret key using device-enhanced password-authenticated key exchange (DE-PAKE).

6. The method of claim 1, wherein generating the reconstructed second secret key comprises generating the reconstructed second secret key using a fuzzy vault opener ($FV_{OPEN}$).

7. The method of claim 6, wherein using the $FV_{OPEN}$ comprises:
extracting, with at least one processor, a plurality of second biometric data points from the second biometric input;
communicating, with at least one processor, the plurality of second biometric data points;
receiving, with at least one processor, a plurality of polynomial encodings, each respective polynomial encoding of the plurality of polynomial encodings based on a respective second biometric data point of the plurality of second biometric data points, wherein the fuzzy extractor helper data comprises the plurality of polynomial encodings; and
generating, with at least one processor, the reconstructed second secret key based on the plurality of polynomial encodings.

8. The method of claim 1, wherein generating the second secret key comprises generating the second secret key using device-enhanced password-authenticated key exchange (DE-PAKE).

9. The method of claim 1, wherein generating the fuzzy extractor helper data comprises generating the fuzzy extractor helper data using a fuzzy vault generator ($FV_{GEN}$).

10. The method of claim 9, wherein using the $FV_{GEN}$ comprises:
extracting, with at least one processor, a plurality of first biometric data points from the first biometric input;
generating, with at least one processor, a plurality of random data points;
generating, with at least one processor, a polynomial encoding of each first biometric data point of the plurality of first biometric data points based on the second secret key;
generating, with at least one processor, a random encoding of each random data point of the plurality of random data points; and
combining, with at least one processor, the polynomial encoding of each first biometric data point of the plurality of first biometric data points and the random encoding of each random data point of the plurality of random data points into a set of encodings, wherein the fuzzy extractor helper data comprises the set of encodings.

11. The method of claim 10, wherein using the $FV_{GEN}$ further comprises:
combining, with at least one processor, the plurality of first biometric data points and the plurality of random data points to form a first set of data points;
generating, with at least one processor, a respective set of neighboring data points for each respective data point of the first set of data points based on a threshold distance; and
storing each respective set of neighboring data points as a tuple with each respective data point in the set of encodings.

12. The method of claim 10, wherein using the $FV_{GEN}$ further comprises:
permuting, with at least one processor, the set of encodings before storing the fuzzy extractor helper data comprising the set of encodings.

13. A computer-implemented method, comprising:
receiving, with at least one processor, first biometric input data associated with a first biometric input and first secret key data associated with a first secret key;
extracting, with at least one processor, a plurality of first biometric data points from the first biometric input;
generating, with at least one processor, a plurality of random data points, wherein a superset of datapoints comprises the plurality of first biometric data points and the plurality of random data points;
generating, with at least one processor, a polynomial encoding of each first biometric data point of the plurality of first biometric data points using the first secret key, wherein generating the polynomial encoding of each first biometric data point comprises encoding the first secret key as coefficients of a polynomial and encoding each first biometric data point using the polynomial;
generating, with at least one processor, a random encoding of each random data point of the plurality of random data points, wherein the random encoding of each random data point is associated with a different datapoint from the superset of datapoints;
combining, with at least one processor, the polynomial encoding of each first biometric data point of the plurality of first biometric data points and the random encoding of each random data point of the plurality of random data points into a set of encodings; and
storing, with at least one processor, the set of encodings as fuzzy extractor helper data.

14. The method of claim 13, comprising:
receiving, with at least one processor, second biometric input data associated with a second biometric input;
extracting, with at least one processor, a plurality of second biometric data points from the second biometric input;
communicating, with at least one processor, the plurality of second biometric data points;
receiving, with at least one processor, a plurality of encodings, each respective encoding of the plurality of encodings based on a respective second biometric data point of the plurality of second biometric data points, wherein the set of encodings of the fuzzy extractor helper data comprises the plurality of encodings;
generating, with at least one processor, a reconstructed first secret key based on the plurality of polynomial encodings;
determining, with at least one processor, that the reconstructed first secret key matches the first secret key; and
authenticating, with at least one processor, a user based on determining the reconstructed first secret key matches the first secret key.

15. A system, comprising:
at least one processor; and
at least one non-transitory computer-readable medium comprising instructions to direct the at least one processor to:
receive first password data associated with a first password, first biometric input data associated with a first biometric input, and first secret key data associated with a first secret key;
generate a second secret key using the first secret key, the first password, and a password-to-random protocol;
generate fuzzy extractor helper data using the first biometric input and the second secret key;
store the fuzzy extractor helper data and the first secret key;
receive one of attempted password data associated with an attempted password or second biometric input data associated with a second biometric input; and
obliviously generate a reconstructed second secret key using the first secret key and the attempted password in response to receiving the attempted password data or using the second biometric input and the fuzzy extractor helper data in response to receiving the second biometric input.

16. A system, comprising:
at least one processor; and
at least one non-transitory computer-readable medium comprising instructions to direct the at least one processor to:
receive first biometric input data associated with a first biometric input and first secret key data associated with a first secret key;
extract a plurality of first biometric data points from the first biometric input;
generate a plurality of random data points, wherein a superset of datapoints comprises the plurality of first biometric data points and the plurality of random data points;
generate a polynomial encoding of each first biometric data point of the plurality of first biometric data points using the first secret key, wherein generating the polynomial encoding of each first biometric data point comprises encoding the first secret key as coefficients of a polynomial and encoding each first biometric data point using the polynomial;
generate a random encoding of each random data point of the plurality of random data points, wherein the random encoding of each random data point is associated with a different datapoint from the superset of datapoints;
combine the polynomial encoding of each first biometric data point of the plurality of first biometric data points and the random encoding of each random data point of the plurality of random data points into a set of encodings; and
store the set of encodings as fuzzy extractor helper data.

17. A computer program product, the computer program product comprising at least one non-transitory computer-readable medium including one or more instructions that, when executed by at least one processor, cause the at least one processor to:

receive first password data associated with a first password, first biometric input data associated with a first biometric input, and first secret key data associated with a first secret key;

generate a second secret key using the first secret key, the first password, and a password-to-random protocol;

generate fuzzy extractor helper data using the first biometric input and the second secret key;

store the fuzzy extractor helper data and the first secret key;

receive one of attempted password data associated with an attempted password or second biometric input data associated with a second biometric input; and obliviously generate a reconstructed second secret key using the first secret key and the attempted password in response to receiving the attempted password data or using the second biometric input and the fuzzy extractor helper data in response to receiving the second biometric input.

18. A computer program product, the computer program product comprising at least one non-transitory computer-readable medium including one or more instructions that, when executed by at least one processor, cause the at least one processor to:

receive first biometric input data associated with a first biometric input and first secret key data associated with a first secret key;

extract a plurality of first biometric data points from the first biometric input;

generate a plurality of random data points, wherein a superset of datapoints comprises the plurality of first biometric data points and the plurality of random data points;

generate a polynomial encoding of each first biometric data point of the plurality of first biometric data points using the first secret key, wherein generating the polynomial encoding of each first biometric data point comprises encoding the first secret key as coefficients of a polynomial and encoding each first biometric data point using the polynomial;

generate a random encoding of each random data point of the plurality of random data points, wherein the random encoding of each random data point is associated with a different datapoint from the superset of datapoints;

combine the polynomial encoding of each first biometric data point of the plurality of first biometric data points and the random encoding of each random data point of the plurality of random data points into a set of encodings; and store the set of encodings as fuzzy extractor helper data.

* * * * *